United States Patent
Ramadhane et al.

(10) Patent No.: US 11,106,833 B2
(45) Date of Patent: Aug. 31, 2021

(54) CONTEXT AWARE SENSITIVE DATA DISPLAY

(71) Applicant: International Business Machines Corporation, Armonk, NY (US)

(72) Inventors: Mohamed Zouhaier Ramadhane, Mexico City (MX); Joseph Saab, Santiago (CH); Fernando Ramos Zuliani, Costa Mesa, CA (US); Mauricio Monroy Andrade, Mexico City (MX)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/563,264

(22) Filed: Sep. 6, 2019

(65) Prior Publication Data
US 2021/0073420 A1  Mar. 11, 2021

(51) Int. Cl.
*G06F 21/84* (2013.01)
*G06F 40/20* (2020.01)
(Continued)

(52) U.S. Cl.
CPC ............... *G06F 21/84* (2013.01); *G06F 40/20* (2020.01); *G06K 9/00362* (2013.01); *G06N 5/04* (2013.01);
(Continued)

(58) Field of Classification Search
None
See application file for complete search history.

(56) References Cited

U.S. PATENT DOCUMENTS

| 10,349,211 | B1* | 7/2019 | Do | .................. H04W 4/022 |
| 2005/0066068 | A1* | 3/2005 | Karaoguz | ................ G06F 3/14 |
| | | | | 710/1 |

(Continued)

FOREIGN PATENT DOCUMENTS

| KR | 20180021597 A | 3/2018 |
| WO | WO2017065745 A1 | 4/2017 |

(Continued)

OTHER PUBLICATIONS

Sergej Zerr, Stefan Siersdorfer, Jonathon Hare, Elena Demidova, "Privacy-Aware Image Classification and Search", 2012, Proceedings of the 35th International ACM SIGIR Conference on Research and Development in Information Retrieval, pp. 35-44, https://doi.org/10.1145/2348283.2348292 (Year: 2012).*

(Continued)

*Primary Examiner* — Michael J Cobb
(74) *Attorney, Agent, or Firm* — Aaron Pontikos; George S. Blasiak; Heslin Rothenberg Farley & Mesiti PC

(57) ABSTRACT

Methods, computer program products, and systems are presented. The method computer program products, and systems can include, for instance: presenting first data on a first area of a display, wherein the first data is non-sensitive data; presenting second data on a second area of the display, wherein the second data is sensitive data; wherein the first data is displayed to feature a first viewing angle, and wherein the second data is displayed to feature a second viewing angle, wherein the second viewing angle is narrower than the first viewing angle so that a range of viewing angles from the display at which displayed data is visible is larger for the first data than for the second data.

20 Claims, 16 Drawing Sheets

(51) Int. Cl.
  *G09G 5/14*    (2006.01)
  *G06K 9/00*    (2006.01)
  *G06N 20/00*   (2019.01)
  *G06N 5/04*    (2006.01)
  *G06F 40/30*   (2020.01)

(52) U.S. Cl.
  CPC .............. *G06N 20/00* (2019.01); *G09G 5/14* (2013.01); *G09G 2340/0407* (2013.01); *G09G 2354/00* (2013.01); *G09G 2358/00* (2013.01); *G09G 2370/20* (2013.01)

(56) References Cited

U.S. PATENT DOCUMENTS

| | | | | |
|---|---|---|---|---|
| 2005/0243265 | A1* | 11/2005 | Winlow | G02F 1/1323 349/178 |
| 2010/0275266 | A1 | 10/2010 | Jakobson et al. | |
| 2014/0184471 | A1* | 7/2014 | Martynov | G06F 3/0481 345/1.2 |
| 2015/0324434 | A1* | 11/2015 | Greenwood | G06F 16/00 707/722 |
| 2016/0210473 | A1* | 7/2016 | Cohen | G06F 21/10 |
| 2016/0357790 | A1* | 12/2016 | Elkington | G06N 20/00 |
| 2017/0116425 | A1* | 4/2017 | Chang | G02B 5/3016 |
| 2017/0124990 | A1* | 5/2017 | Lee | G06F 3/1431 |
| 2018/0232528 | A1* | 8/2018 | Williamson | G06F 21/6254 |
| 2019/0087733 | A1* | 3/2019 | Dooley | G06N 5/04 |
| 2019/0346954 | A1* | 11/2019 | Jung | G06F 3/0481 |
| 2020/0042898 | A1* | 2/2020 | Zaragoza | G06N 5/04 |
| 2020/0134696 | A1* | 4/2020 | Lardeux | G06Q 30/0631 |
| 2020/0175415 | A1* | 6/2020 | Zou | G06N 7/005 |
| 2020/0177731 | A1* | 6/2020 | Aly | G06N 3/08 |
| 2020/0194103 | A1* | 6/2020 | Weldemariam | H04W 4/14 |
| 2020/0201042 | A1* | 6/2020 | Wang | G06F 3/147 |
| 2020/0211061 | A1* | 7/2020 | Dasgupta | G06N 3/08 |
| 2020/0211507 | A1* | 7/2020 | Clarke | G02B 26/005 |

FOREIGN PATENT DOCUMENTS

| | | |
|---|---|---|
| WO | WO2017131816 A1 | 8/2017 |
| WO | WO2018058360 A1 | 4/2018 |

OTHER PUBLICATIONS

"Feature, v." OED Online. Oxford University Press, Dec. 2020. Web. Jan. 30, 2021. (Year: 2020).*
P. Mell, et al. *"The NIST Definition of Cloud Computing"*, NIST Special Publication 800-145, Sep. 2011, Gaithersburg, MD.

* cited by examiner

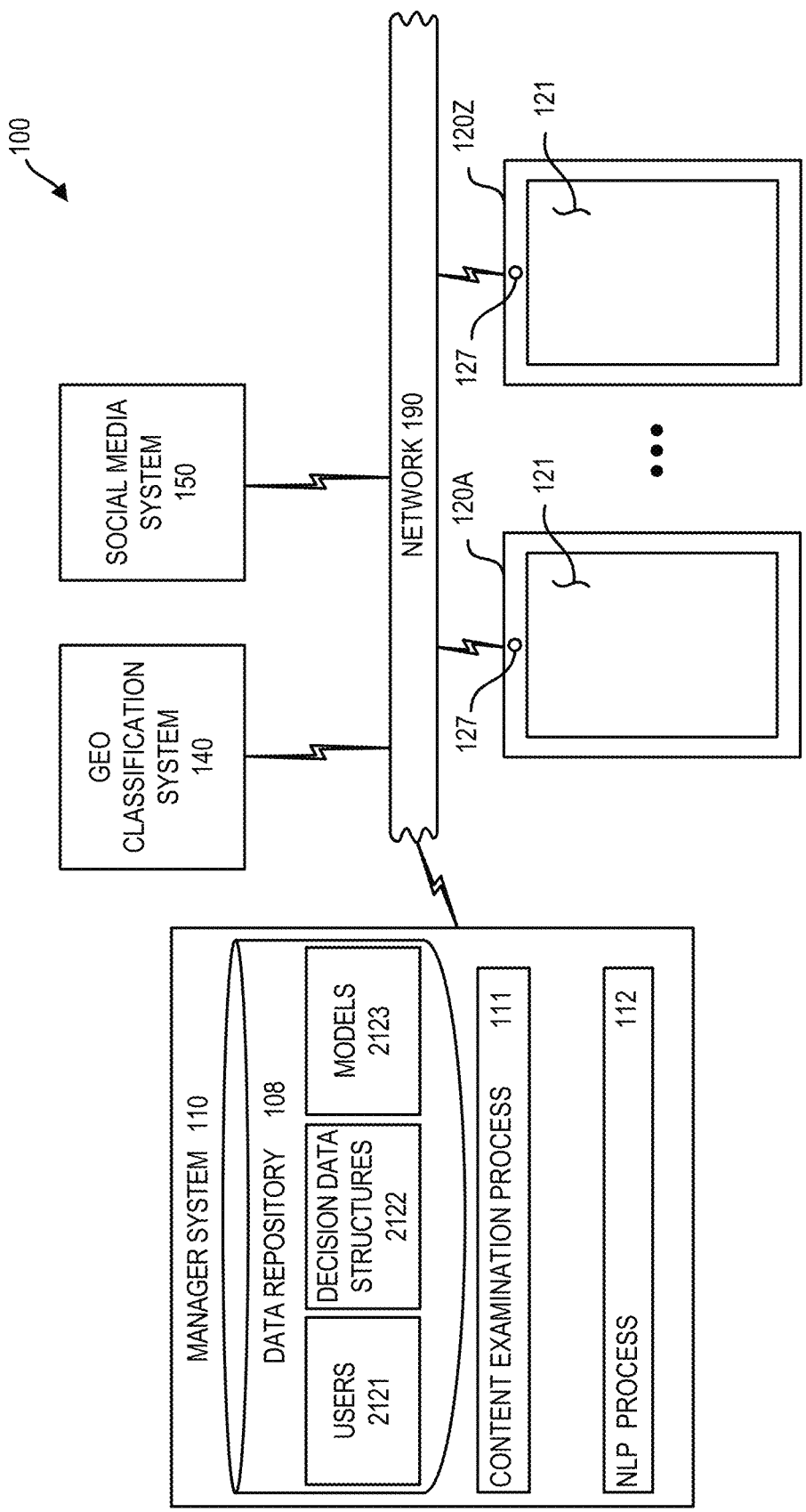

CONTEXT AWARE SENSITIVE DATA DISPLAY

BACKGROUND

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

Location based services (LBS) are software services that use location data to control functionality of computer systems LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, and WI-FI based locating technologies, and other technologies. One example of an LBS is a location based messaging services wherein notifications and other messages to users can be in dependence on the respective locations of the users.

SUMMARY

Shortcomings of the prior art are overcome, and additional advantages are provided, through the provision, in one aspect, of a method. The method can include, for example: presenting first data on a first area of a display, wherein the first data is non-sensitive data; presenting second data on a second area of the display, wherein the second data is sensitive data; wherein the first data is displayed to feature a first viewing angle, and wherein the second data is displayed to feature a second viewing angle, wherein the second viewing angle is narrower than the first viewing angle so that a range of viewing angles from the display at which displayed data is visible is larger for the first data than for the second data.

In another aspect, a computer program product can be provided. The computer program product can include a computer readable storage medium readable by one or more processing circuit and storing instructions for execution by one or more processor for performing a method. The method can include, for example: presenting first data on a first area of a display, wherein the first data is non-sensitive data; presenting second data on a second area of the display, wherein the second data is sensitive data; wherein the first data is displayed to feature a first viewing angle, and wherein the second data is displayed to feature a second viewing angle, wherein the second viewing angle is narrower than the first viewing angle so that a range of viewing angles from the display at which displayed data is visible is larger for the first data than for the second data.

In a further aspect, a system can be provided. The system can include, for example a memory. In addition, the system can include one or more processor in communication with the memory. Further, the system can include program instructions executable by the one or more processor via the memory to perform a method. The method can include, for example: presenting first data on a first area of a display, wherein the first data is non-sensitive data; presenting second data on a second area of the display, wherein the second data is sensitive data; wherein the first data is displayed to feature a first viewing angle, and wherein the second data is displayed to feature a second viewing angle, wherein the second viewing angle is narrower than the first viewing angle so that a range of viewing angles from the display at which displayed data is visible is larger for the first data than for the second data.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 1 depicts a system having a manager system, client computer devices, a geo classification system, and a social media system according to one embodiment;

DETAILED DESCRIPTION

Figure 2A:
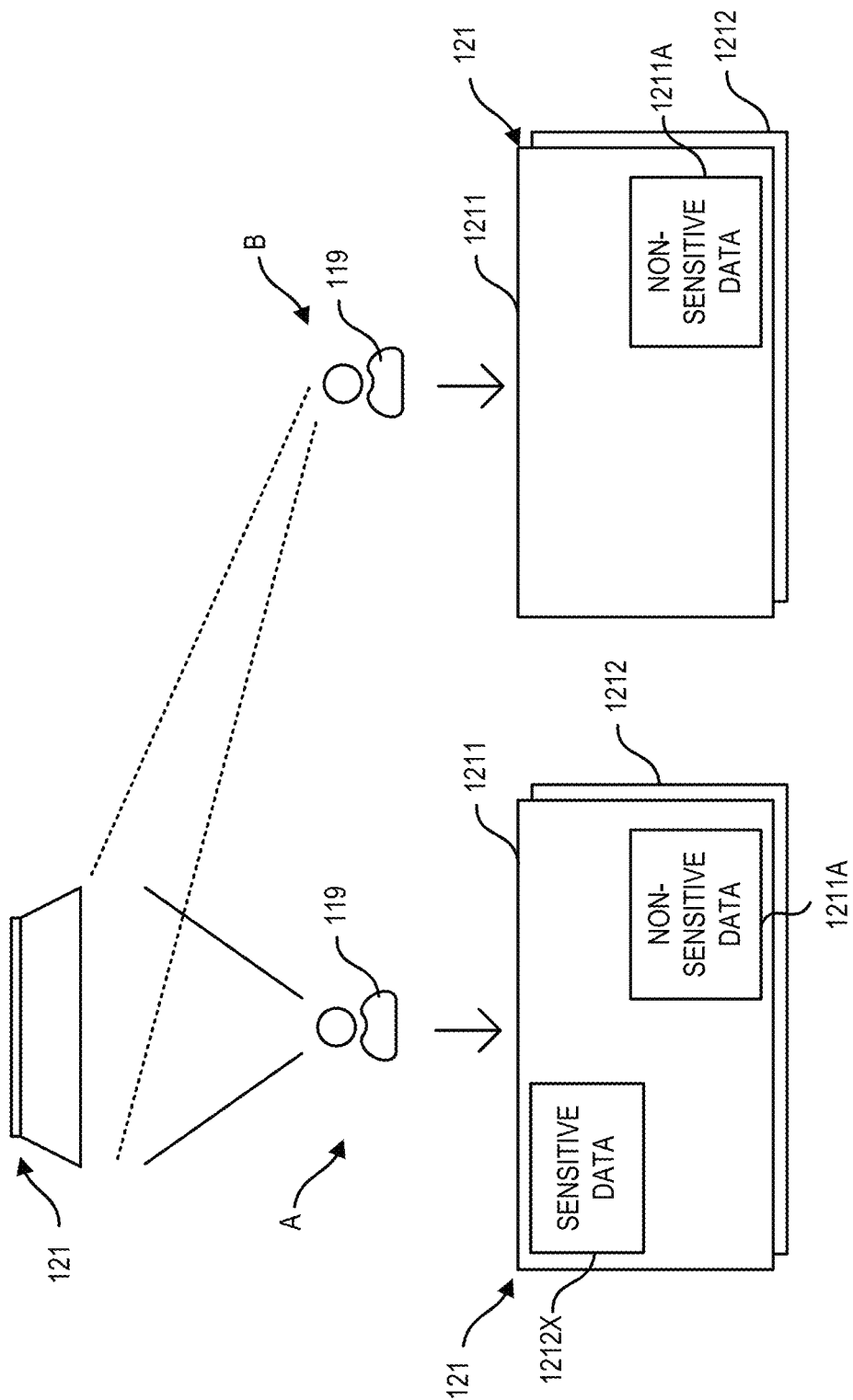
FIG. 2A is a functional schematic diagram depicting operation of a display according to one embodiment.

System 100 for use in cognitive presentment of sensitive and non-sensitive data on a client computer device display is shown in FIG. 1. System 100 can include manager system 110, client computer devices 120A-120Z, geo classification system 140, and social media system 150. Manager system 110, client computer devices 120A-120Z, geo classification system 140, and social media system 150 can be in communication with one another via network 190. System 100 can include numerous devices which can be computing node based devices connected by network 190. Network 190 can be a physical network and/or a virtual network. A physical network can include for example a physical telecommunications network connecting numerous computing nodes or systems such as computer servers and computer clients. A virtual network can for example combine numerous physical networks or parts thereof into a logical virtual network. In another example, numerous virtual networks can be defined over a single physical network.

In one embodiment, manager system 110 can be external to client computer devices 120A-120Z, geo classification system 140, and/or social media system 150. In one embodiment, manager system 110 can be collocated with client computer devices 120A-120Z, geo classification system 140, and/or social media system 150.

Each of the different client computer devices 120A-120Z can be associated to a different user. Regarding one or more client computer device 120A-120Z, a client computer device of one or more client computer device 120A-120Z in one embodiment can be a computing node based device provided by a client computer device, e.g. a mobile device, e.g. a smartphone or tablet, a laptop, smartwatch or PC.

According to one embodiment, respective client computer devices 120A-120Z can include display 121. Display 121 which can be included in respective client computer devices of client computer devices 120A-120Z, can include a first display screen for displaying data which has been classified as being non-sensitive and a second display for displaying data which has been classified as being sensitive. According to one embodiment, respective client computer devices 120A-120Z can include respective camera sensor devices 127.

Geo classification system 140 can associate venues to spatial coordinate ranges associated to the venues. Geo classification system 140 can include enhanced spatial maps pre-marked with tags to indicate uses associated with map features. Map features can include venues having associated venue areas including venue building areas and/or associated venue parking areas. An enhanced map can include tag specifying usage classifications of venues, e.g. residential, business, public and the like. An enhanced map can be tagged to tag features of a map including e.g. roads, bodies of water and infrastructure features such as building walls (exterior and interior) defining enterprise venues. In some cases an enhanced map can be tagged so that that different parts of a building are tagged differently, e.g. a doorway can be tagged differently from a conference room. Geo classification system 140 can provide data tags associated to locations that specify uses associated with various locations. Geo classification system 140 can cognitively map venues identified by venue identifiers, e.g. names, addresses, classifications, and the like, to coordinate location ranges associated to the various venues. Accordingly, manager system 110 querying geo classification system 140, with location data in the form of coordinate location data, can return an identifier venue. Further, geo classification system 140 can cognitively map venues that are listed in geo-classification system with uses associated with such venues, e.g. whether such venues are for residential use or business use and include a variety of additional or alternative use classifications, e.g. public use, roadway use, waterway use, and the like. An enhanced map can be tagged to tag features of a map, including e.g. roads, bodies of water and venues. Venues can be provided e.g. by open spaces, such as developed open spaces or undeveloped open spaces, buildings such as open roof building or closed roof buildings, and/or open spaces associated to buildings, such as building associated with a parking lot. For each venue, geo classification system 140 can associate e.g. identifiers for the venue, ranges and coordinate locations associated with the venue, features associated to the venue, such as building infrastructure features, parking lot features, and other features. Geo classification system 140 according to one embodiment can be provided by GOOGLE MAPS® (GOOGLE MAPS® is a registered trademark of Google, Inc.).

Social media system 150 can include a collection of files, including for example, HTML files, CSS files, image files, and JavaScript files. Social media system 150 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 110 can include a messaging system in one embodiment. During a process of registration wherein a user of system 100 registers as a registered user of system 100, a user sending registration data can send with permission data defining the registration data a permission that grants access by manager system 110 to data of the user within social media system 150. On registration of a user, manager system 110 can examine data of the user of social media system 150. User data of a user within social media system 150 can include various data e.g. post data and text message data. A user can enter registration data using a user interface displayed on a client computer device of client computer devices 120A-120Z. Entered registration data can include e.g. name, address, social media account information, other contact information, biographical information, background information, preferences information, and/or permissions data e.g. can include permissions data allowing manager system 110 to query data of a social media account of a user provided by social media system 150 including messaging system data and any other data of the user. When a user opts-in to register into system 100 and grants system 100 permission to access data of social media system 150, system 100 can inform the user as to what data is collected and why, that any collected personal data may be encrypted, that the user can opt out at any time, and that if the user opts out, any personal data of the user is deleted.

Manager system 110 can include data repository 108. Data repository 108 can store various data. In users area 2121, data repository 108 can store data on users of system 100. Users of system 100 can be computer device users who wish to use their computer devices in a secure manner so that bystander persons (bystander users) adjacent to a client computer device being used by a user cannot view select data being displayed on a display. Users area 2121 can include, e.g. contact information for users, permissions designated by users, session data of users which specifies information of sessions in which computer device of a user has been sued. Session data of a client computer device can include, e.g. identifiers for applications running and for which content has been displayed, data specifying actions of users during a session including feedback actions of the user in which the user manually enters an input to specify the data being displayed as sensitive data.

Data repository 108 in decision data structures area 2122 can store decision data structures for use in providing data decisions. Decision data structures can include e.g. a geo classification mapping data structure that maps coordinates to an expected privacy level associated to the coordinates.

Data repository 108 in models area 2123 can store predictive models for use by manager system 110 in making data decisions. Data repository 108 in models area 2123 can store models that are iteratively trained by machine learning processes. Models area 2123 can store a predictive model that predicts whether content being displayed on a display is regarded to be sensitive by user in dependence e.g. on topic data of the content and/or professional classification of the user.

Manager system 110 can run various processes such as context examination process 111 and natural language processing (NLP) process 112. Manager system 110 running context examination process 111 can predict a sensitivity level of content being displayed on a display to a user of a display device having the display. Manager system 110 running context examination process 111 can apply a multifactor function for predicting sensitivity level of content. The multiple factors of such multifactor function can include e.g. an environment factor in dependence on the physical environment in which the client computer device is being operated and a topic factor in dependence on a topic of content being displayed Manager system 110 can run a natural language processing (NLP) process 112 for determining one or more NLP output parameter of a message. NLP process 112 can include one or more of a topic classification process that determines topics of messages and output one or more topic NLP output parameter, a sentiment analysis process which determines sentiment parameter for a message, e.g. polar sentiment NLP output parameters, "negative," "positive," and/or nonpolar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter. By running of NLP process 112 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message. Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness." Manager system 110 running NLP process 112 can include manager system 110 returning NLP output parameters in addition to those specification topic and sentiment, e.g. can provide sentence segmentation tags, and part of speech tags. Manager system 110 can use sentence segmentation parameters to determine e.g. that an action topic and an entity topic are referenced in a common sentence for example.

Various aspects of display 121 for incorporation into client computer devices 120A-120Z are described in reference to FIGS. 2A-2G. Referring to FIG. 2A, display 121 can be configured so that a user 119 at location A, aligned to display 121 can view more content of display 121 being displayed than user 119 located at location B not aligned with and offset from display 121. The user 119 at location A aligned with display 121 can view content being displayed on both a first display screen 1211 and a second display screen 1212 of display defining display 121. A user 119 at location B who is not aligned with display 121 can view data being displayed on first display screen 1211 of display 121 but not data being displayed on second display screen 1212 of display 121. Embodiments herein will recognize that the user 119 at location B can be the same human individual as user 119 at location A (i.e. an individual can move from location A to location B). Embodiments herein will also recognize that user 119 at location B can alternatively be a second user provided by an unscrupulous bystander user who may be simultaneously viewing display 121 with user 119 at location A. Client computer device of client computer devices 120A-120Z can be configured to display non-sensitive data on a first display screen 1211 and can be further configured to display sensitive data on second display screen 1212 of display 121. Configured as described, a bystander adjacent and offset relative to display 121 is restricted from viewing sensitive data being displayed on display 121.

FIG. 2A is a schematic diagram depicting features of display 121 according to one embodiment. Display 121 can include a first display screen 1211 and second display screen 1212. Display 121 can be disposed within and incorporated into a client computer device 120A, which generically represents any of client computer devices 120A-120Z as shown in FIG. 1.

Display 121 can include first display screen 1211 and second display screen 1212. Client computer device 120A can be configured to display non-sensitive data on first display screen 1211 and can be further configured to display sensitive data on second display screen 1212.

Figure 2B:
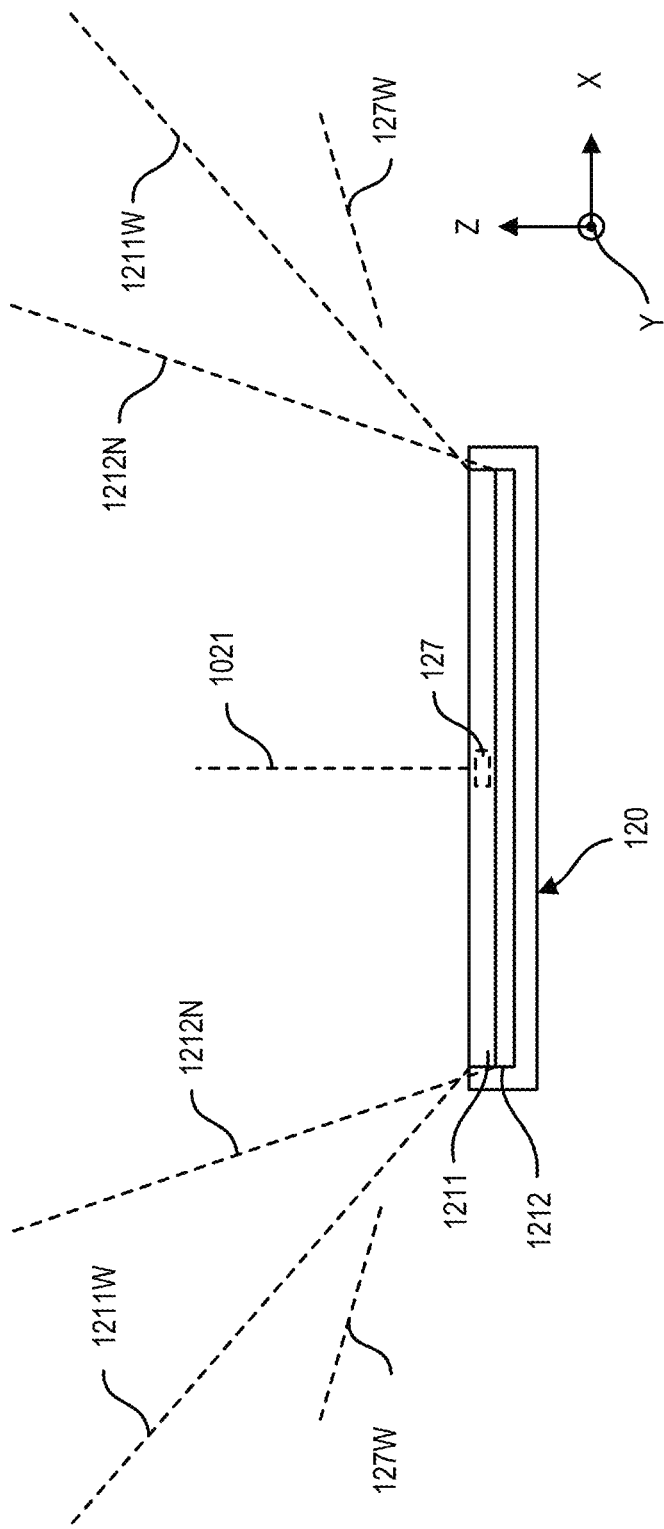
FIG. 2B is a functional schematic diagram depicting operation of a display according to one embodiment.

Referring to the schematic view of FIG. 2B, first display screen 1211 for display of non-sensitive data can have a first wider viewing angle as indicated by boundary light rays 1211W and second display screen 1212 for display of sensitive data can include a second narrower viewing angle as indicated by boundary light rays 1212N. For display data to feature a first viewing angle, a client computer device can display data on first display screen 1211. For display of data to feature a second viewing angle narrower that the first viewing angle, a client computer device can display data on second display screen 1212. Boundary light rays 1211W can be defined by projected light rays projected by edge pixels of first display screen 1211 and boundary light rays 1212N can be defined by light projections of edge pixels of second display screen 1212. There is set forth herein according to one embodiment, presenting first data on a first area of a display, wherein the first data is non-sensitive data; presenting second data on a second area of the display, wherein the second data is sensitive data; wherein the first data is displayed to feature a first viewing angle, and wherein the second data is displayed to feature a second viewing angle, wherein the second viewing angle is narrower than the first viewing angle so that a range of viewing angles from the display at which displayed data is visible is larger for the first data than for the second data. Boundary light rays 1211W and boundary light rays 1212N can be defined by light projections of different sets of edge pixels of display screen 1211 (for wider angle boundary light rays 1211W) and display screen 1212 (for narrower angle boundary light rays 1211N) as display 121 is rotated about vertical axis 1021 of display 121 extending through display 121 which display can be horizontally extending.

With further reference to FIG. 2B, an angle defined by boundary light rays 1211W and boundary light rays 1212N can be rotationally symmetric about vertical axis 1021 extending perpendicularly through display 121. The depicted first and second viewing angles depicted in FIG. 2B illustrate a required eye position of a user for viewing data being displayed on the first display screen 1211 or the second display screen 1212. When a user's eyes are within boundary light rays 1211W but not within boundary light rays 1212N, the user can see content being displayed on first display screen 1211 but not second display screen 1212. When a user's eyes are within boundary light rays 1212N and therefore also within boundary light rays 1211W the user can see content being displayed on first display screen 1211 as well as content being displayed on second display screen 1212. Display 121 can be configured so that the user will not see displayed content, unless the user's eyes are disposed within boundary light rays 1211W (for content being displayed by first display screen 1211) or within boundary light rays 1212N and a user will not view content being displayed on second display screen 1212 (unless the user's eyes are within boundary light rays 1212N). It will be seen that a user for viewing content being displayed on second display screen 1212, should be positioned so that the user's eyes substantially oppose second display screen 1212. The user's eyes are at an angle from and offset from second display screen 1212 the user will be unlikely to be capable of viewing content being displayed on second display screen 1212. There is set forth herein according to one embodiment, presenting first data on a first area of a display, wherein the first data is non-sensitive data; presenting second data on a second area of the display, wherein the second data is sensitive data; wherein the first data is displayed to feature a first viewing angle, and wherein the second data is displayed to feature a second viewing angle, wherein the second viewing angle is narrower than the first viewing angle so that a range of viewing angles from the display at which displayed data is visible is larger for the first data than for the second data.

With further reference to FIG. 2B, first display screen 1211 and second display screen 1212 can occupy a common set of X, Y axis coordinates. According to one embodiment, first display screen 1211 and second display screen 1212 can be defined in different planes that are closely spaced together. According to one embodiment, first display screen 1211 and second display screen 1212 can be defined in a common plane. First display screen 1211 and second display screen 1212 can occupy common X,Y coordinates (e.g. from the perspective of the user viewer who will not discern the one pixel offset difference between the first and second display screens). Each of the first display screen 1211 and the second display screen 1212 can span the entirety of X,Y coordinate space occupied by display 121. Accordingly, from the perspective of the user, each of the first display screen 1211 and the second display screen 1212 is capable of displaying data at any X,Y coordinate space area of display 121.

Figure 2C:
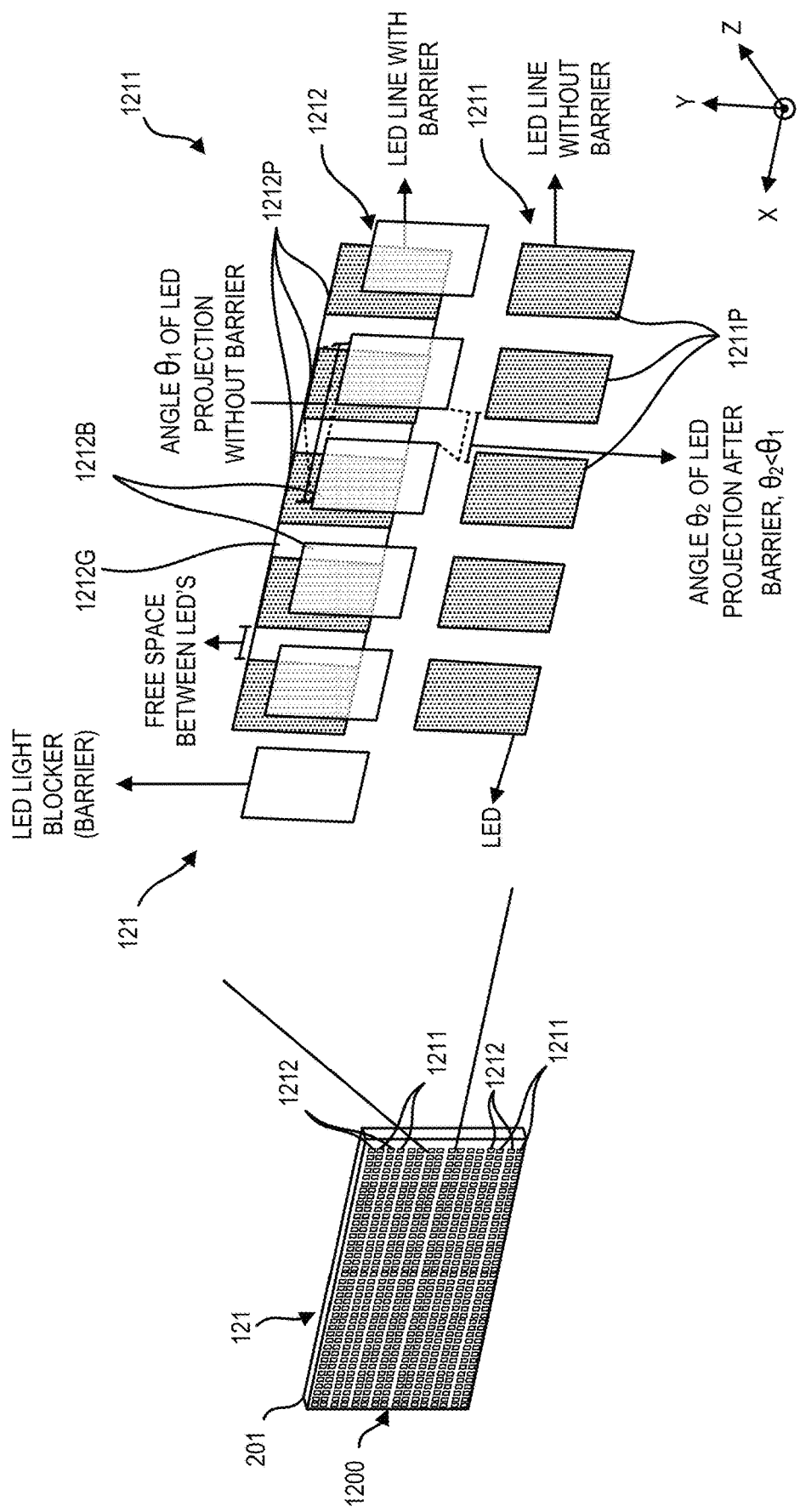
FIG. 2C is a physical schematic diagram depicting features of a display according to one embodiment.

As shown by the embodiment of FIG. 2C, first display screen 1211 and second display screen 1212 of display 121 can be defined by pixels disposed in a common plane. Referring to FIG. 2C, first display screen 1211 can be defined by first individual pixels 1211P and second display screen 1212 can be defined by second display by second individual pixels 1212P. The first individual pixels 1211P and second individual pixels 1212P can extend in a common plane, can be supported on a common substrate, e.g. silicon substrate, and can be pixels of a common display pixel array. In the embodiment of FIG. 2C, the first display screen 1211 and second display screen 1212 can be defined by interleaved lines (i.e. rows or columns of pixels alternating interleaved lines of pixels). According to one embodiment, a display pixel array defining display 121 can include even rows of pixels that define first display screen 1211 and odd rows of pixels that define second display screen 1212. For configuring second display screen 1212 to have a narrower viewing angle than first display screen 1211, display 121 can include barriers 1212B. Pixels 1212P defining second display defining second display screen 1212 can be disposed to have gaps 1212G therebetween, and barriers 1212B can be arranged to be disposed forwardly aligned with respect to such gaps 1212G. Arranged as described, barriers 1212B can be opaque type barriers so that barriers 1212B block light emitted from pixels 1212P defining second display screen 1212.

As shown in FIG. 2C pixels 1211P defining first display screen 1211 can be absent of barriers 1212B that are disposed forwardly of pixels 1212P. Accordingly, because pixels 1211P can be absent of associated barriers 1212B, pixels 1211P can project light at a larger projection angle than pixels 1212P defining second display screen 1212. Arranged as described, the defined first display screen 1211 can include a larger viewing angle than second display screen 1212. In the embodiment of FIGS. 2E and 2F, individual pixels 1211P defining first display screen 1211 and individual pixels 1212P defining second display screen 1212 can have differentiated optics to define different projection angles and in turn different display screen viewing angles. Optics associated with pixels of second display screen 1212 can be characterized by light blocking elements and the optics associated with pixels of first display screen can be characterized by the absence of such light blocking elements.

Figure 2D:
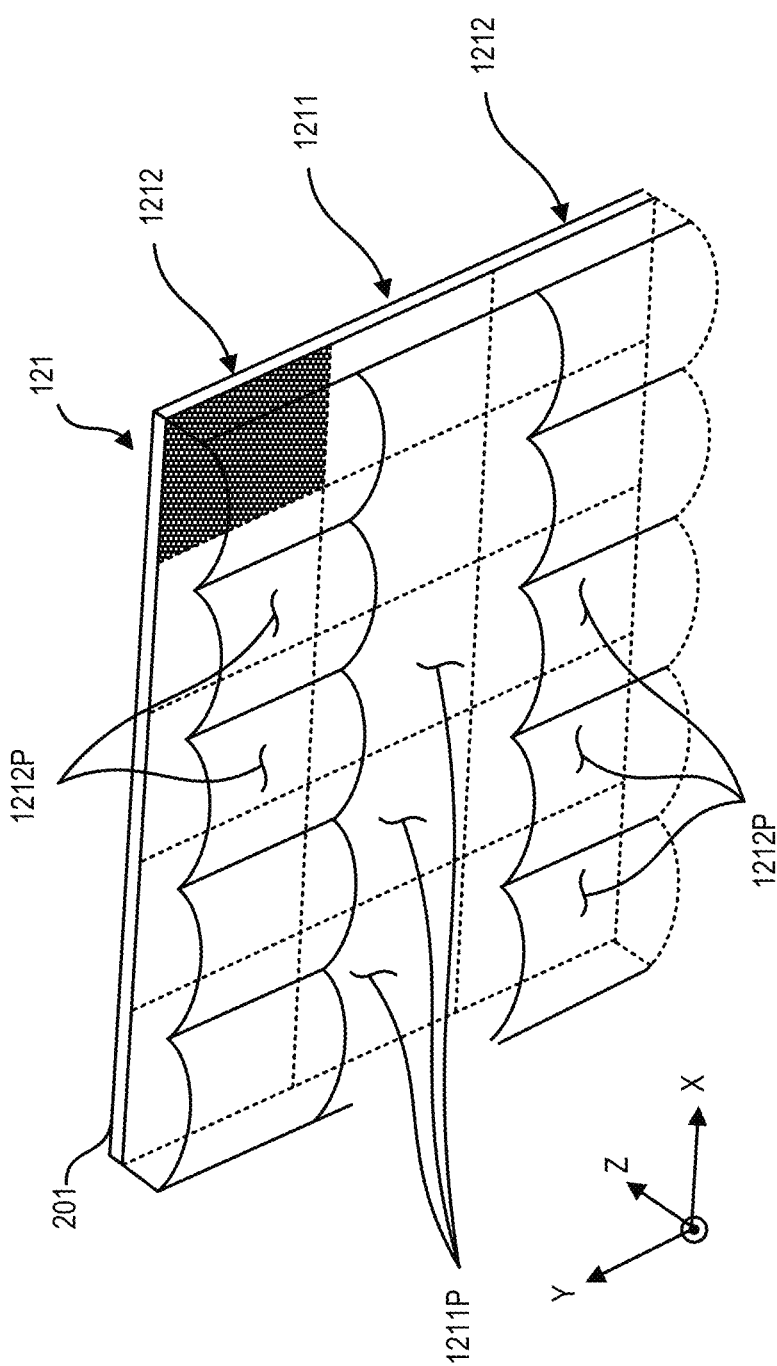
FIG. 2D is a physical schematic diagram depicting features of a display according to one embodiment.
Figure 2E:
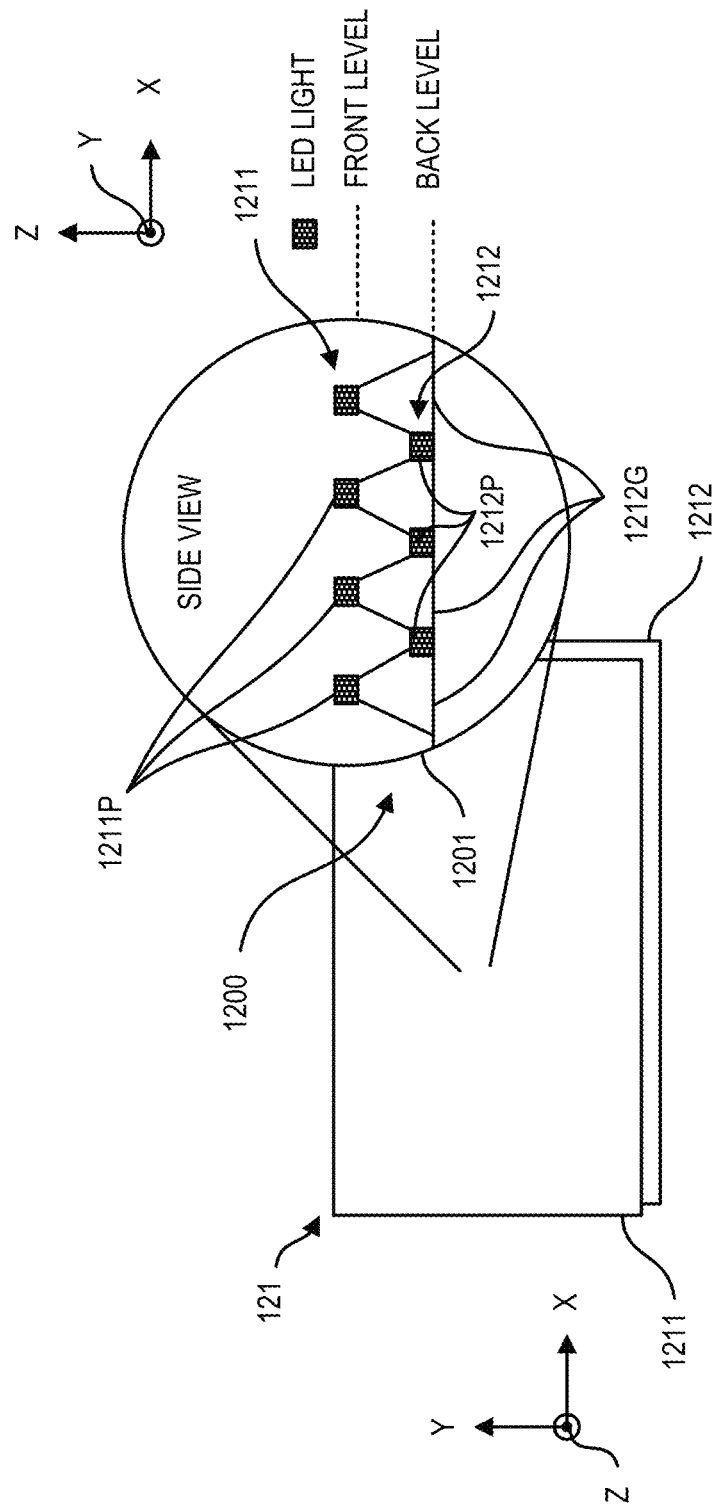
FIG. 2E is a physical schematic diagram depicting features of a display according to one embodiment.
Figure 2F:
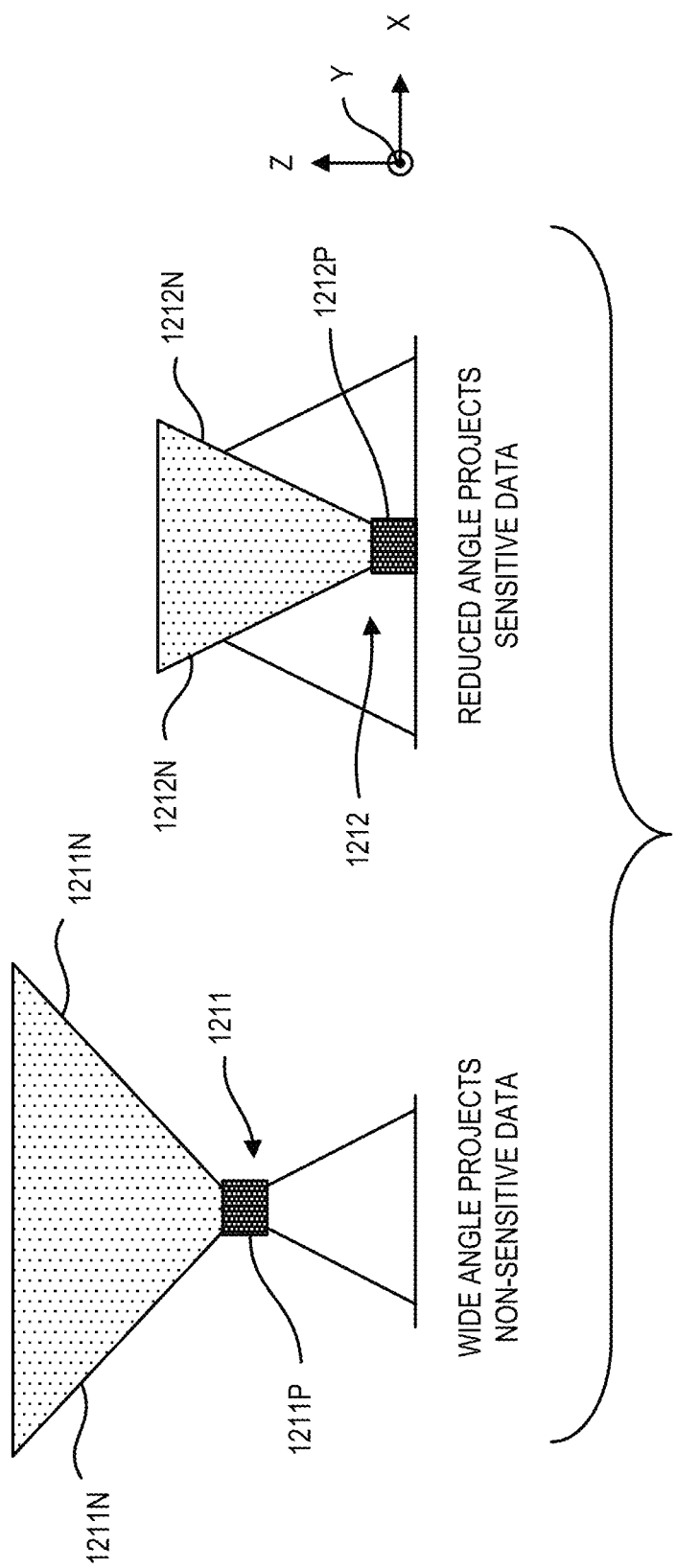
FIG. 2F is a physical schematic diagram depicting features of a display according to one embodiment.

An alternative embodiment is shown in FIG. 2D. The embodiment of FIG. 2D is similar to the embodiment of FIG. 2C. Each of first display screen 1211 and second display screen 1212 is disposed in a common X,Y plane as in the embodiment of FIG. 2C. First display screen 1211 can be defined by first individual pixels 1211P and second display screen 1212 can be defined by second individual pixels 1212P. In the embodiment of FIG. 2D a narrower projection angle for pixels 1212P defining second display screen 1212 can be provided by way of optical lenses rather than by way of optical of light blocking elements as in the embodiment of FIG. 2C.

In the embodiment of FIG. 2D alternate lines, e.g. rows or columns of pixels, can be differentiated. According to one embodiment, even rows of pixels can define first display screen 1211 and odd rows of pixels can define second display screen 1212. Odd rows of pixels can have collimating lenses disposed forwardly of respective pixels as shown in FIG. 2D and odd rows of pixels can be absent of such lenses. The collimating lenses included in association with pixels 1212P defining second display screen 1212 can collimate projected light so that a projection angle of each pixel is narrower relative to an angle a projection in the absence of such lens. Thus, in the described embodiment of FIG. 2D pixels 1211P can have wider projection angles than pixels 1212P defining second display screen 1212. In the embodiment of FIGS. 2E and 2F, individual pixels 1211P defining first display screen 1211 and individual pixels 1212P defining second display screen 1212 can have differentiated optics to define different projection angles and in turn different display screen viewing angles. Optics associated with pixels of second display screen 1212 can be characterized by collimating lenses as shown in FIG. 2D, and the optics associated with pixels of first display screen can be characterized by the absence of such collimating lenses. Optics associated with pixels of first display screen could alternately be characterized by lenses configured to project light at a wider angle than the collimating lenses of the second display screen.

Each of display 121 of FIG. 2C and display 121 of FIG. 2D can comprise a light emitting diode (LED) display pixel array, wherein pixels of the pixels array are all disposed in a common X,Y plane and wherein pixels of the pixel array are supported by and fabricated on a common substrate e.g. silicon substrate.

In the embodiment of FIG. 2E, display 121 can have an LED display pixel array 1200 in which all pixels 1212P defining second display screen 1212 and all pixels 1211P defining first display screen 1211 are commonly supported on a common semiconductor substrate 201, such as a silicon semiconductor substrate.

In the embodiment of FIG. 2E pixels 1212P defining second display screen 1212 extend in an X,Y plane that is different from the X,Y plane in which pixels 1211P defining first display screen 1211 extend. In the embodiment of FIG. 2E, pixels 1211P defining first display screen 1211 extend in an X,Y plane at a first elevation and pixels 1212P defining second display screen 1212 extend at a second elevation lower than the first elevation. First display screen 1211 can be defined forwardly of second display screen 1212.

The embodiment of FIGS. 2E and 2F operates in a manner similar to the embodiment of FIG. 2C. In the embodiment of FIGS. 2E and 2F, the projection angle of pixels 1212P defining second display screen 1212 is limited by light blocking elements as in the embodiment of FIG. 2C, except that in the embodiment of FIG. 2E the light blocking elements are provided by pixels 1211P of first display screen 1211. As in the prior embodiments, first display screen 1211 and second display screen 1212 can occupy common X,Y coordinate dimensions. Respective elevations of first display screen 1211 and second display screen 1212 can be closely spaced so that a user cannot readily (if at all) discern whether a viewed image has been presented by the first display screen 1211 or the second display screen 1212. According to some embodiments, such as in the embodiments of FIGS. 2C and 2D first and second display screens 1211 and 1212 can occupy a common set of elevations, such as where pixels defining the first display screen and second pixels defining a the second screen are disposed in a common plane (e.g. where the first pixels and the second pixels are pixels of a common display pixel array supported by a common substrate).

FIG. 2F depicts further details of the embodiment of FIG. 2E. FIG. 2F depicts single pixel operation of pixels defining first display screen 1211 and second display screen 1212. As shown in FIG. 2F pixels 1211P defining first display screen 1211 can have relatively wider viewing angles defined by boundary light rays 1211W and pixels 1212P of second display screen 1212 can have narrower projection angles delimited and defined by boundary light rays 1212N. According to the operation of the embodiment of FIGS. 2E and 2F, the narrower projection angle of pixels 1212P defining second display screen 1212 can be provided by the blocking operation of forwardly disposed pixels 1211P disposed forwardly of pixels 1212P.

As shown in FIG. 2E, LED display pixel array 1200 can include gaps 1212G between pixels 1212P of second display screen 1212. Pixels 1211P can be disposed forwardly of pixels 1212P and aligned with gaps 1212G to limit the angle of projected light projected from respective ones of pixels 1212P defining second display screen 1212. Pixels 1211P can be provided to be opaque so that pixels 1211P block light emitted by pixels 1212P. In the embodiment of FIGS. 2E and 2F, individual pixels 1211P defining first display screen 1211 and individual pixels 1212P defining second display screen 1212 can have differentiated optics to define different projection angles and in turn different display screen viewing angles. Optics associated with pixels of second display screen 1212 can be characterized by light blocking elements defining by pixels 1211P of first display screen, and the optics associated with pixels of first display screen can be characterized by the absence of such light blocking elements.

Figure 2G:
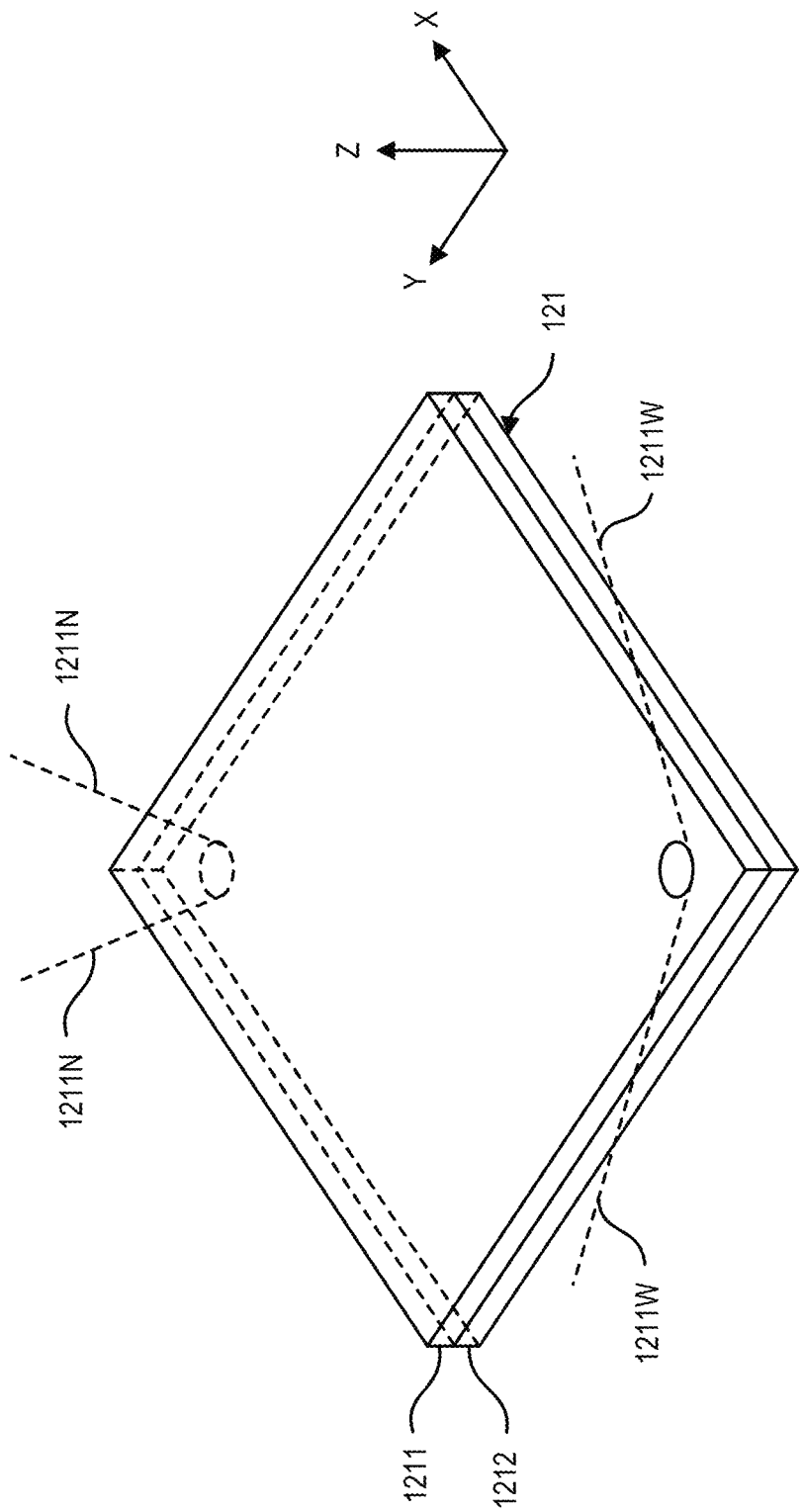
FIG. 2G is a physical schematic diagram depicting features of a display according to one embodiment.

Another embodiment of display 121 is illustrated in FIG. 2G. In the embodiment of FIG. 2G, each of first display screen 1211 and second display screen 1212 can be provided by a generally planar structure. First display screen 1211 can be provided by a transparent LED screen. Display screen 1211 can be configured so that display screen 1212 can be viewed through display screen 1211. Thus, a user is able to view the contents being displayed on display screen 1212 by looking through display screen 1211. Display screen 1212 can be provided by a display screen of any technology transparent or nontransparent. Display screen 1212, for example, can be a liquid crystal display (LCD) screen. Display screen 1212 can alternatively be provided by an LED display screen. If display screen 1212 is provided by an LCD display screen the LCD display screen can have backlighting of any technology, e.g. can be cold cathode fluorescent lamp based (CCFL) or can comprise LED backlighting (an LED backlit LCD display).

Embodiments herein recognize that CCFL backlit LCD displays can have reduced viewing angles relative to flat-panel displays of alternative technologies. Accordingly, second display screen 1212, in one embodiment can be selected to be provided by a CCFL backlit LCD display screen. Like all the embodiments of FIGS. 2C-2G, the embodiment of FIG. 2G can have functionality as described in connection with FIGS. 2A and 2B. First display screen 1211 can be selected to have a wider viewing angle as indicated by boundary light rays 1211W emanating from edge pixels of an area of first display screen 1211 and second display screen 1212 can be selected to have a narrower viewing angle as indicated by boundary light rays 1212N and defined by projected light projected from edge pixels of an area of second display screen 1212.

Referring again to FIG. 2A, client computer device 120 can be configured to display non-sensitive data 1211A on first display screen 1211 and sensitive data 1212X on second display screen 1212. Client computer device 120 can be further configured, e.g. so that a user interface action using display 121, e.g. a single tap of a displayed content area changes the current display configuration from a non-sensitive configuration to a sensitive display configuration or vice versa. For example, referring to FIG. 2A, client computer device 120 can be configured so that a single tap of displayed non-sensitive data 1211A causes client computer device 120 to display the localized non-sensitive data 1211A in a sensitive display configuration on second display screen 1212 as sensitive data 1212X at the same X,Y coordinates of display 121. Client computer device 120 can be configured so that a single tap of displayed sensitive data 1212X causes client computer device 120 to display the localized sensitive data 1212X in a non-sensitive display configuration on first display screen 1211 as sensitive data 1211A at the same X,Y coordinates of display 121. According to another aspect, client computer device 120 can be configured so that double tapping a localized certain displayed content area changes a current display configuration to a high-resolution display configuration in which pixels of a first display screen 1211 and second display screen 1212 are used for display of data of the localized certain displayed content area and can further be configured so that subsequent double tap reverts the display configuration for the certain displayed content area to its previous configuration. Client computer device 120 can be configured so that when a content area of an application presently classified as private according to user specified configuration data is tapped to indicate that a user wishes to switch a display configuration for the content area to a non-sensitive display configuration, client computer device 120 can switch the application privacy classification for the application to open for the duration of a current use session but restore the prior private classification on termination of the current use session.

Figure 3:
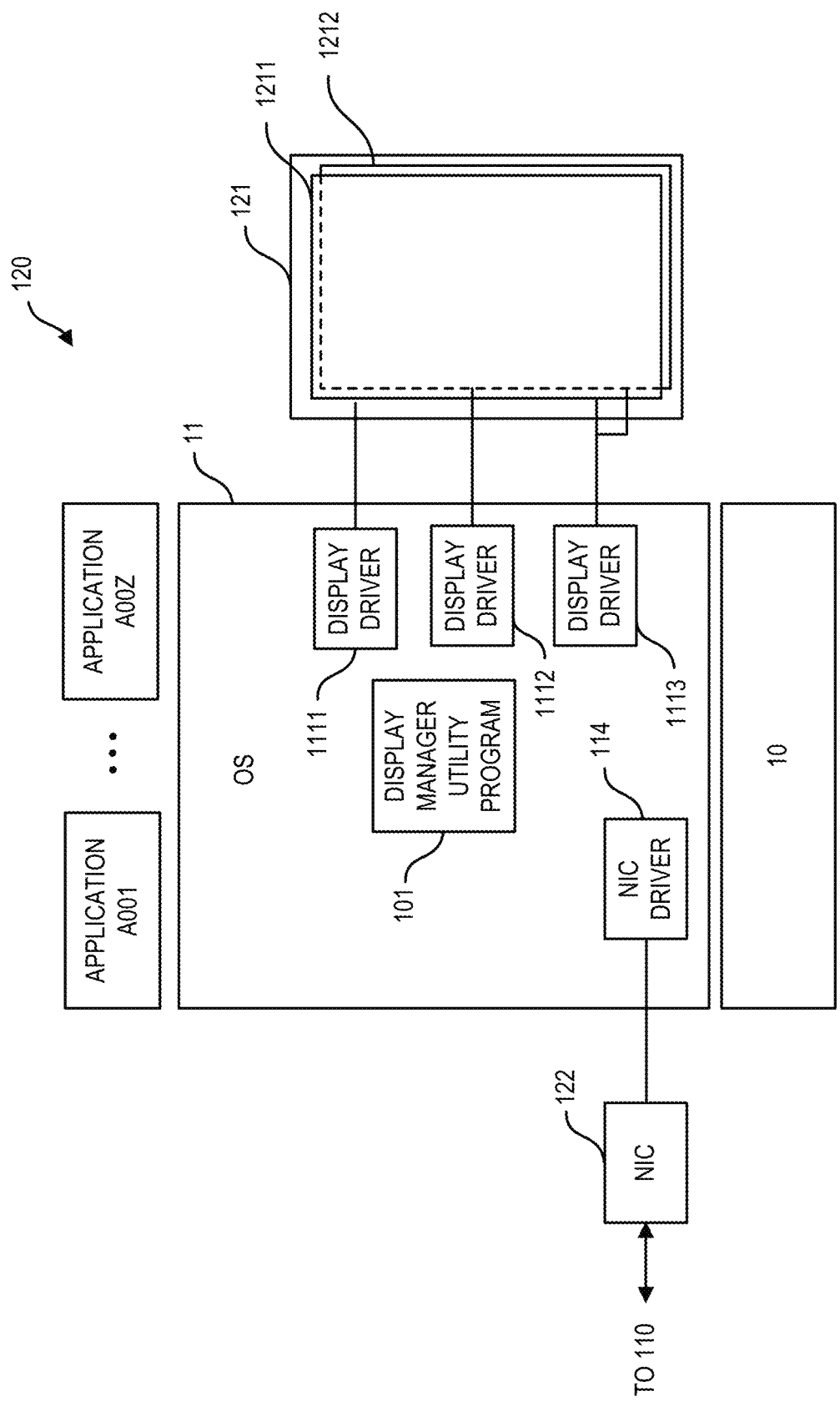
FIG. 3 is a schematic diagram depicting software architecture of the client computer device of any display according to one embodiment.

FIG. 3 illustrates a software architecture for client computer device 120 having display 121 according to one embodiment. Client computer device 120 generically depicted in FIG. 3 can generically represent any one of client computer devices 120A-120Z as shown in FIG. 1. Referring to FIG. 3 client computer device 120 can include operating system 11 running on computing node 10 provided by a physical computing node. Client computer device 120 can also include a plurality of applications A001-A00Z running on operating system 11. Applications A001-A00Z can comprise a wide variety of applications, e.g. an application for e-mail, an application for a video game, an application for personal financial planning, an application for navigation, and the like. Operating system 11 can include display manager utility program 101 which manages the display of data on display 121. Display manager utility program 101 can receive requests for display of data on display 121 from applications A001-A00Z and in response to such requests, make decisions, as to the display of data on display 121. Among its functions, display manager utility program 101 can display data of currently running applications on display 121.

Operating system 11 can include various display drivers. Operating system 11, according one embodiment can include first display driver 1111, second display driver 1112, and third display driver 1113. Display driver 1111 can be in communication with the first display screen 1211 but not second display screen 1212, second display driver 1112 can be in communication with second display screen 1212 but not first display screen 1211, and third display driver 1113 can be in communication with each a first display screen 1211 and second display screen 1212 in combination. Display manager utility program 101 can communicate with third display driver 1113 for display of high-resolution content in which pixels of first display screen 1211 and second display screen 1212 are utilized for presentment of displayed content. Operating system 11 can also include Network Interface Card (NIC driver) 114 for communication with NIC 122. NIC 122, according to one embodiment can be in communication with manager system 110. There is set forth presenting first data on a first area of a display, wherein the first data is non-sensitive data, presenting second data on a second area of the display, wherein the second data is sensitive data; wherein the first data is displayed to feature a first viewing angle, and wherein the second data is displayed to feature a second viewing angle, wherein the second viewing angle is narrower than the first viewing angle so that a range of viewing angles from the display at which displayed data is visible is larger for the first data than for the second data, wherein the display is disposed on a client computer device, wherein the display has a first display screen and a second display screen, the first display screen configured to display content at the first viewing angle, the second display screen configured to display content at the second viewing angle, wherein an operating system of the client computer device includes a first display driver to facilitate communication of the operating system with the first display screen, a second display driver to facilitate communication of the operating system with the second display screen, and a third display driver to facilitate communication of the operating system with the first display screen and the second display screen in combination, wherein the method includes the operating system sending frame display data through the third display driver to display on the display high resolution data that is displayed at a higher pixel resolution than a pixel resolution at which the second data is displayed.

Returning now to FIG. 4, FIG. 4 is a flowchart illustrating a method for performance by client computer device 120 (e.g. by display manager utility program 101) interoperating with manager system 110 and display 121 of client computer device 120. At block 1201, client computer device 120 can be examining various data to determine whether a use session of client computer device 120 has commenced. A use session can be commenced e.g. by power-up of client computer device 120 or a user interface action to wake up client computer device 120 from a sleep state. Prior to performance of block 1211 a user of client computer device 120 may have registered client computer device 120 so that a user associated with client computer device 120 can receive services provided by manager system 110. For such registration a user can use user interface 5000 as depicted in FIG. 5.

User interface 5000 can be a displayed user interface for display on display 121. User interface 5000 can include contact area 5010 in which the user can enter contact information, e.g. name, address, telephone number, email address, social media addresses, and the like. On registration of each new user, manager system 110 can assign a Universally Unique Identifier (UUID) for each new user and can store data of the user associated to an assigned the UUID in users area 2121 of data repository 108. In permissions area 5020, a user can specify permissions to permit manager system 110 to access and use select and limited personal data of a user. Permissions specified in permissions area 5020 can include permissions, e.g. to access location data of a user, e.g. as may be output by a GPS sensor of client computer device 120 of a user. Permissions can also include permissions to access and use social media data of a user, such as post data of a user posted on a social media system 150. Permissions specified in permissions area 5020 can also include permissions to allow manager system 110 to obtain and use data specifying e.g. applications running on client computer device 120 data respecting users of such applications and/or data collected by running of such applications. In profile area 5030 a user can specify data indicating a professional classification of the user, e.g., software architect, lawyer, physician, and the like. Manager system 110 can read such entered data to determine a professional profile of a user. Alternatively, and/or additionally, manager system 110 can discern professional classifications of a user by examining data of social media system 150. A user in configuration area 5040 can specify whether applications running on client computer device 120 are private applications or open applications.

Manager system 110 can run NLP process 112 to return topic classifiers for content such as text content associated with each application and can provide recommendations for classification based on return topics return by activation of running NLP process 112. For recommending classifications of applications as either private or open manager system 110 can employ a decision data structure as shown in Table A below.

TABLE A

| Row | Topic | Privacy Classification |
|-----|-------|------------------------|
| 1 | XX | Open |
| 2 | XX | Private |
| 3 | XX | Private |
| 4 | XX | Open |
| ... | ... | ... |

Manager system 110 determining a topic associated with an application can examine Table A to determine a topic and can determine a privacy classification of associated the topic. For example, for the topic of Row 3, manager system 110 can return the privacy classification of private. For the topic of Row 4 manager system 110 can return the privacy classification of open. Where application of NLP process 112 herein results in return of more than one topic manager system 110 can select the highest ranking topic associated to the content as the selected topic of the content.

Using area 5040, client computer device 120 can be configured so that a user can override a recommended privacy classification for any application. According to one embodiment, client computer device 120 can be configured so that all display data of an application specified as private by a user using area 5040 is displayed by default on second display screen 1212 of display 121 and can be further configured so that all data of applications specified as being open by a user using area 5040 is displayed on first display screen 1211 of display 121 by default.

Figure 4:
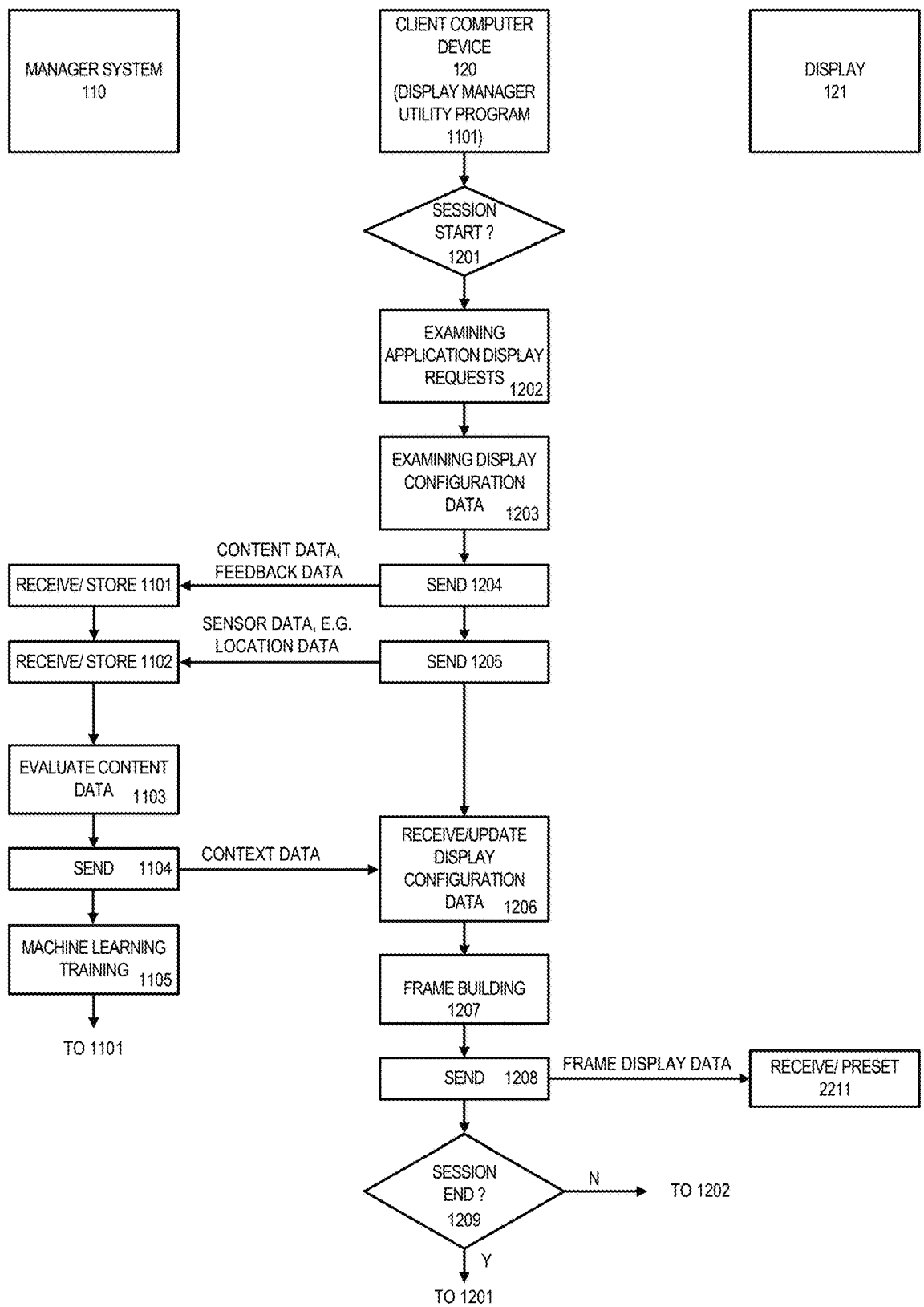
FIG. 4 is a flowchart illustrating a method for performance by a client computer device interoperating with a manager system according one embodiment.
Figure 5:
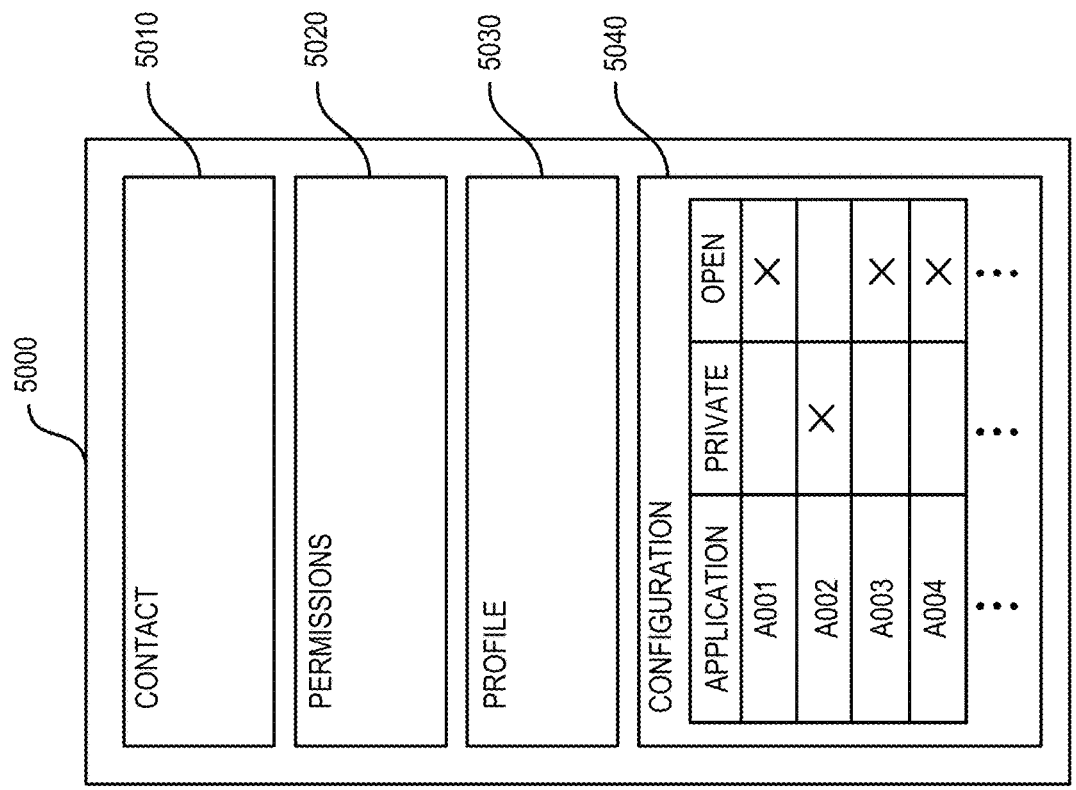
FIG. 5 depicts a user interface for display on a display of a client computer device according to one embodiment.

In another aspect, as described with further reference to the flowchart of FIG. 4, system 100 can be configured so that the default condition display of data can be overridden in dependence on determined context data of client computer device 120. Referring again to the flowchart of FIG. 4, client computer device 120 at block 1201 can determine whether a use session of client computer device 120 has commenced. On the determination that a use session is commenced client computer device 120 can proceed to block 1202.

At block 1202, client computer device 120 can examine data of any application display requests received from any of applications A001-A00Z running on operating system (OS) 11 and at block 1203 client computer device 120 can examine display configuration data being maintained by display manager utility program 101 for the display of application data on display 121. Table B illustrates display configuration data that can be maintained and used by display manager utility program 101.

TABLE B

| Row | Application | Application Privacy Classification | Content area | Coordinate Space | Sensitivity Classification |
|-----|-------------|-----------------------------------|--------------|------------------|----------------------------|
| 1 | A001 | Open | C1 | XX | Non-Sensitive |
| 2 | A001 | Open | C2 | XX | Sensitive |
| 3 | A001 | Open | C3 | XX | Non-Sensitive HR |
| 4 | A002 | Private | C1 | XX | Sensitive |
| 5 | A003 | Open | C1 | XX | Non-Sensitive |
| 6 | A004 | Open | C1 | XX | Non-Sensitive HR |
| ... | ... | ... | ... | ... | ... |

Referring to Table B, the application column lists applications currently requesting display of data on display 121. As depicted in Table B, applications A001-A004 can be currently open, running, and requesting display of data on display 121. The application privacy classification can specify the user specified privacy classification (private or open) for each application, which classification can be based on a recommendation from manager system 110. In the described example of Table B, application A002 can be specified as private and applications A001, A003, and A004 can be specified as being open. The content area column of Table B specifies discrete and spaced apart content areas associated to each open and running application. In the described example, application A001 can have three spatially separate and discrete content areas C1, C2 and C3 and the remaining open and running applications can have respectively a single content area. Content areas herein can include e.g. text, photograph, and/or graphics data. The column coordinate space can specify the X,Y coordinates associated to each respective content area. The sensitivity classification column of Table B can specify a current sensitivity classification for each content area.

According to one embodiment, system 100 can be configured so that all data of an application specified to be a private application is classified with the sensitivity classification of sensitive and client computer device 120 can be configured to display all sensitive classified data on second display screen 1212. According to one embodiment, system 100 can be configured so that when an application privacy classification of an application has been specified to be open, system 100 can return a sensitivity classification for content area associated with the application as being sensitive or non-sensitive depending on return context data as set forth herein.

Client computer device 120 can be configured to display non-sensitive data 1211A defining a displayed content area on first display screen 1211 and sensitive data 1212X defining a displayed content area on second display screen 1212. Client computer device 120 can be further configured, e.g. so that a user interface action using display 121, e.g. a single tap of a displayed content area changes the current display configuration from a non-sensitive configuration to a sensitive display configuration or vice versa. For example, referring to FIG. 2A, client computer device 120 can be configured so that a single tap of displayed non-sensitive data 1211A causes client computer device 120 to display the localized non-sensitive data 1211A in a sensitive display configuration on second display screen 1212 as sensitive data 1212X at the same X,Y coordinates of display 121 as the previously displayed non-sensitive data 1211A. Client computer device 120 can be configured so that a single tap of displayed sensitive data 1212X causes client computer device 120 to display the localized sensitive data 1212X in a non-sensitive display configuration on first display screen 1211 as non-sensitive data 1211A at the same X,Y coordinates of display 121 as the previously displayed sensitive data 1212X (as indicated by the description accompanying 2C-2G client computer device 120 can activate different pixels, i.e. pixels of different display screens, for display of the same data at common X,Y coordinates of display 121 when transitioning between a non-sensitive display configuration to a sensitive display configuration, or vice versa, and display 121 can be configured so that a user viewing display 121 can perceive the display as occurring at the same X,Y coordinates of display 121). According to another aspect, client computer device 120 can be configured so that double tapping a localized certain displayed content area changes a current display configuration to a high-resolution display configuration in which pixels of a first display screen 1211 and second display screen 1212 can be used in combination for display of data of the localized certain displayed content area and can further be configured so that a subsequent double tap reverts the display configuration for the certain displayed content area to its previous configuration. Client computer device 120 can be configured so that when a content area of an application presently classified as private according to user specified configuration data is tapped to indicate that a user wishes to switch a display configuration for the content area to a non-sensitive display configuration, client computer device 120 can switch the application privacy classification for the application to open.

For displaying data on display 121, which can include first display screen 1211 and second display screen 1212, display manager utility program 101 can include mapping data that maps coordinate spaces to (a) pixel addresses of first display screen 1211; (b) pixel addresses of second display screen 1212; and (c) pixel addresses of a high-resolution display screen defined by the combination a first display screen 1211 and second display screen 1212. Display manager utility program 101 can examine such mapping data when dynamically transitioning the display of data of a content area between first display screen 1211 and second display screen 1212 and/or the described high-resolution display screen defined by the combination a first display screen 1211 and second display screen 1212. Client computer device 120 on completion of block 1203 can proceed to block 1204.

At block 1204, client computer device 120 can send content data and/or feedback data for receipt by manager system 110 at block 1101. At block 1101, manager system 110 can receive the sent content data and/or feedback data and can store such data into data repository 108, e.g. in users area 2121. The content data received at block 1101 can include text, photograph, and/or graphics data from each current open application content area specified in Table B. The feedback data received at block 1101 can include any feedback data wherein the user has entered an input into display 121. Feedback data can include data of single tap and double tap user interface actions set forth herein, wherein a user can enter a single tap or double tap to change a current display configuration for displayed content to specify that data currently being displayed in a non-sensitive display configuration e.g. wide viewing angle is to be displayed instead of a sensitive display configuration (narrow viewing angle). Feedback data herein can also include the inverse, wherein the user enters a single tap or double tap into display 121 to specify that data currently being displayed in a sensitive display configuration (narrow viewing angle) is to be displayed instead in a wide viewing angle display configuration (non-sensitive display configuration).

Further referring to the flowchart of FIG. 4, manager system 110, on completion of block 1101, can proceed to block 1102. At block 1102, manager system 110 can receive various data from client computer device 120 which can be sending various data at send block 1205. Received data received at block 1202 can include, e.g. sensor data e.g. location data, radio signal data, video camera data, accelerometer data, user body temperature data, air temperature data, and/or pulmonary biometric data output by one or more sensor disposed within client computer device 120. In response to receiving the received data at block 1102 manager system 110 can store the received data in users area 2121 of data repository 108. On completion of block 1102 manager system 110 can proceed to block 1103.

At block 1103, manager system 110 can evaluate content data. Manager system 110 performing block 1103 can include manager system 110 applying Eq. 1 as follows:

$$S = F_1 W_1 + F_2 W_2 \quad \text{(Eq. 1)}$$

Where S is a scoring value that indicates the sensitivity level of a currently displayed content area, $F_1$ is a first factor, $F_2$ is a second factor, and $W_1$ and $W_2$ are weights associated with the first and second factors.

Manager system 110 can be configured to return a predicted sensitivity level score, S, for each content area specified in Table B for which content data is received at block 1101. According to one embodiment, manager system 110 at block 1101, can receive data for each content area of each open and running application of client computer device 120 that are currently classified as open applications.

With further reference to Eq. 1, factor $F_1$ can be an environmental factor and factor $F_2$ can be a topic factor. According to one embodiment, the environmental factor can be in dependence, e.g. on a crowdedness of a current environment of client computer device 120, one or more current motion attribute of client computer device 120, and/or on a current location of client computer device 120. Manager system 110 can assign higher values for factor $F_1$ when client computer device 120 is operating in an environment where display 121 is more likely to be viewed by untrusted bystanders and can assign lower values under factor $F_1$ where client computer device 120 is determined to be operating an environment where display 121 is less likely to be viewed by untrusted bystanders.

For determination of data values to apply under factor $F_1$ manager system 110 can apply Eq. 2 as follows:

$$VF_1 = PF_1 W_1 + PF_2 W_2 + PF_3 W_3 \quad \text{(Eq. 2)}$$

Where $PF_1$ is a first environmental factor, $PF_2$ is a second environmental factor, $PF_3$ is a third environmental factor, and $W_1$ to $W_3$ are weights associated with the different environmental factors.

Referring to Eq. 2, $PF_1$ can be crowdedness factor. For determining crowdedness of a current environment of a user according to one embodiment, manager system 110 can examine location data with all registered users of system 100 and can ascertain whether a user is currently in close proximity the plurality of other users based on location data.

Sensor data received a block 1102, in one embodiment, can include short range radio signal data, i.e. data output by a short range radio transceiver disposed within client computer device 120 such as a Bluetooth radio transceiver radio. The transmitted radio signal data sent at block 1205 received at block 1102 can include radio signal data indicating radio signal transmissions received from devices in close proximity to the short range radio transceiver disposed in client computer device 120. Manager system 110 can be configured to determine a crowdedness of a current environment of client computer device 120, by examination of the described radio signal data received at block 1102, e.g. a higher rate of received transmissions can indicate a larger crowd. Manager system 110 can assign higher values under factor $PF_1$ where an environment is determined to be more crowded and can assign lower values under factor $PF_2$ where an environment is determined to be less crowded. Manager system 110 can additionally or alternatively be configured to determine a crowdedness of a current environment of client computer device 120, by examination of the described video camera data received at block 1102. Client computer device 120 at block 1205 can be sending video camera data for receipt by manager system 110 at block 1202. Client computer device 120 can include an integrated camera sensor device 127 as shown in FIG. 1 and FIG. 2B for output of video camera data. Client computer device 120 can be configured so that camera sensor device 127 can have a field of view indicated by boundaries 127W (FIG. 2B) wider than a viewing angle of first display screen 1211 indicated by boundary light rays 1211W (FIG. 2B). Client computer device 120 can be configured so that a field of view of the camera sensor device 127 (having a field of view angle indicated by boundaries 127W) is wider than a viewing angle of first display screen 1211 indicated by boundary light rays 1211W (FIG. 2B). Manager system 110 can be configured to process received video camera data at block 1103 for recognizing users within a field of view of camera device 127. Manager system 110 can count a number of users within a field of view of camera sensor device 127 based on the recognizing of users. Because of the described coordination between the field of view of camera sensor device 127 can a viewing angle of first display screen 1211, manager system 110 can ascertain that a user within a field of view of camera sensor device 127 is within a viewing angle of first display screen 1211. Manager system 110 can assign higher values under factor $PF_1$ where an environment is determined to be more crowded and can assign lower values under factor $PF_2$ where an environment is determined to be less crowded.

Factor $PF_2$ of Eq. 2 can be a motion factor. Factor $PF_2$ can examine path data of a client computer device 120 over time. Manager system 110 can examine such path data to determine whether a user using client computer device 120 is currently moving at a vehicle travel speed. Manager system 110 can assign higher values under factor $PF_2$ where manager system 110 determines that the user is traveling at a vehicle travel speed and can assign lower values under factor $PF_2$ when determining that a user is currently stationary. Manager system 110 can assign higher values under factor $PF_2$ determining that a user is traveling at a vehicle travel speed based on the observation that a user, when traveling at the vehicle travel speed, is more likely to be in the vicinity of bystanders capable of viewing data displayed on display 121. Travel at a vehicle travel speed can indicate e.g. that a user is traveling on a public roadway potentially with passengers and potentially is traveling on a public transportation vehicle.

Manager system 110 applying factor $PF_3$ can use the decision data structure of Table C according to one embodiment. Manager system 110 can use sensitivity levels for factor $PF_3$ using the decision data structure of Table C.

TABLE C

| Row | Location coordinate range | Type classification | Sensitivity level |
|---|---|---|---|
| 1 | XX | Public Park | 0.7 |
| 2 | XX | Private residence of user | 0.1 |
| 3 | XX | Restaurant | 0.9 |
| 4 | XX | Business Office | 0.4 |
| ... | ... | | ... |

The decision data structure of Table C maps location coordinate ranges to venue type classifications to sensitivity levels. According to one embodiment, Table C can include predetermined, sensitivity levels assigned to different type classifications. For populating the decision data structure of Table C which can be stored in decision data structures area 2122 of data repository 108, manager system 110 iteratively during the deployment period of system 100 can query data of geo classification system 140 which can store iteratively updated information, e.g. on uses of different venues. Manager system 110, using the decision data structure of Table C, can assign sensitivity levels in dependence on a current location of a client computer device 120 and a user 119 associated to such client computer device 120. Using the decision data structure of Table C manager system 110 can assign sensitivity levels in dependence on the likelihood of a bystander viewing display data of display 121 based on the venue type of a user's current location. Referring to Table C, manager system 110 can assign higher sensitivity levels under factor $PF_3$ where a user is at a publicly accessible venue such as a restaurant or public park and can assign lower values under factor $PF_3$ where a user, based on examination of location data of the user, is currently located at a location not accessible by the public, such as a private residence of a user.

Referring again to Eq. 1 manager system 110 can use Eq. 3 for assigning data values under factor $F_2$ of Eq. 1 (topic factor).

$$VF_2 = TF_1 W_1 + TF_2 W_2 \qquad (Eq. 3)$$

Where $VF_2$ is a data value to be applied under factor $F_2$ of Eq. 1, where $TF_1$ is a predetermined mapping factor, where $TF_2$ to is a predictive model query factor, and $W_1$ and $W_2$ are weights associated with factors $TF_1$ and $TF_2$.

TABLE D

| Row | Topic | Sensitivity level |
|---|---|---|
| 1 | XX | 0.4 |
| 2 | XX | 0.9 |
| 3 | XX | 0.2 |
| 4 | XX | 0.8 |
| ... | ... | ... |

Manager system 110 can use the decision data structure of Table D to assign values under factor $TF_1$ of Eq. 3. For each content area for which data is received at block 1101, manager system 110 can activate NLP process 112 (FIG. 1) to ascertain a topic classifier for the content area. For return topics e.g. relating to a football championship, manager system 110 can assign lower sensitivity levels to return topics using Table D and for other return topics (such as e g financial investment related topics) manager system 110 can return higher sensitivity levels using Table D.

Figure 6:
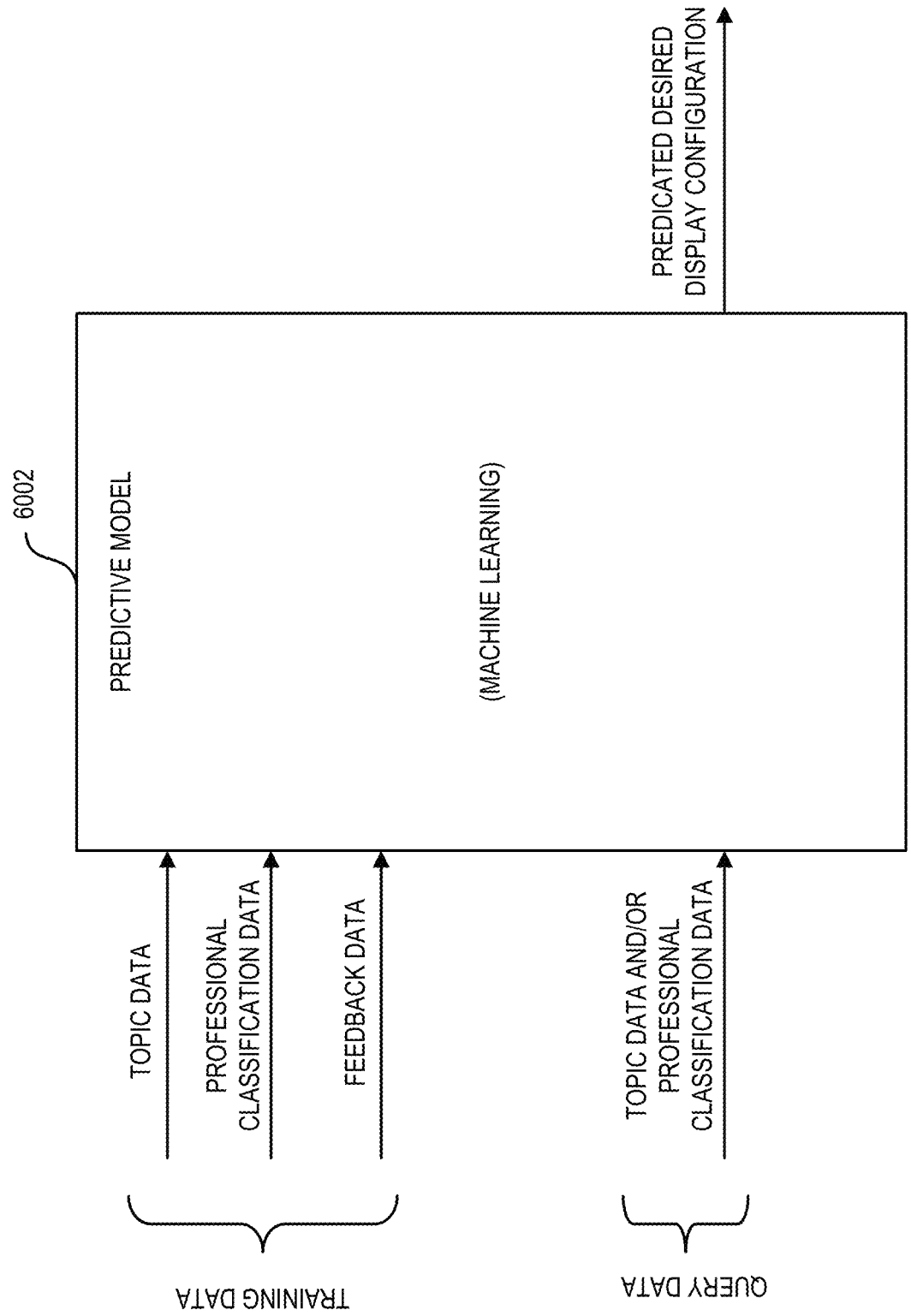
FIG. 6 depicts a predictive model that can be trained with use of machine learning training according to one embodiment.

Referring to topic factor $TF_2$ of Eq. 3, manager system 110 for returning data values under factor $TF_2$ of Eq. 3 can query predictive model 6002 as shown in FIG. 6. Predictive model 6002, as shown in FIG. 6, can be trained with use of machine learning training to predict a desired display configuration of a user based on historical data of the user and in some embodiments, other users of system 100.

Predictive model 6002 can be trained with iterations of training data. According to one embodiment, each iteration of training data can include a dataset associated to a display event. A display event herein can refer to an event in which data of a discrete content area as set forth herein was displayed on a display 121. Training data defining a training dataset associated with the display event can include, for each iteration in each event (a) topic data; (b) professional classification data; and (c) feedback data. The topic data can be the returned topic for the content area returned by activation of NLP process 112. The professional classification data can be the professional classification, e.g. software architect, lawyer, physician of the user using the client computer device during the display event and feedback data can specify the action of the user during the display event. The feedback data can specify, e.g. that the user did nothing to change the display of the content area during the display event or alternatively the feedback data can specify that the user took action to change a current display configuration, e.g. from a non-sensitive display configuration to a sensitive display configuration (or vice versa) during the display event.

Predictive model 6002, once trained, can be configured to respond to query data. Query data applied at block 1103 using Eqs. 1 and 3 (factor $TF_2$) can include query data of a current use session the query data can include topic data specifying a topic of the content area examined at block 1103. Query data applied to predictive model 6002 for return of data under factor $TF_2$ can also include data specifying a professional classification of the user currently using client computer device 120. Manager system 110 can ascertain a professional classification of a current user e.g. using user entered data entered into profile area 5030 of user interface 5000 (FIG. 5) or e.g. by examination of post data of the user posted on social media system 150.

According to one embodiment, training data applied for training of predictive model 6002 can be restricted to be training data of the current user of client computer device 120. According to another embodiment training data applied for training of predictive model 6002 can include crowdsourced data, i.e. can include data of a plurality of users, such as all users of system 100 across a plurality of devices such as all devices being managed by system 100. In such an embodiment where global training data is used manager system 110 is able to return data in an increased range of scenarios, e.g. where new topic encountered for which data of the current user has not been obtained or where the current user is a new user for whom history data has not been obtained. Predictive model 6002 once trained with training data is able to respond to query data. Output data output by predictive model 6002 in response to receipt of query data can include data specifying a predicted desire display configuration for a current content area being examined at block 1103.

Embodiments herein recognize that with use of predictive model 6002 manager system 110 is able to return sensitivity level determinations in dependence on historical past actions of a user and/or similar users, e.g. who have a common professional classification as the current user. For example, where a user habitually indicates a certain type of data as being sensitive, system 100 will recognize that trend and adjust operation of system 100 so that system 100 can automatically mark similar content and can automatically display similar content in a sensitive display configuration. Embodiments herein recognize that display data that is non-sensitive for a first classification of users can be sensitive for a second classification of users. For example, a photograph depicting a building may not be sensitive for physician users but may be sensitive for users who are classified as being building insurance adjuster users.

Returning to the flowchart of FIG. 4, manager system 110 on completion of block 1103 can proceed to block 1104. At block 1104, manager system 110 can send returned context data for receipt by client computer device 120 at block 1206. The context data can include e.g. scoring values returned by manager system 110 using Eq. 1 for each of the examined content areas subject to examination at block 1103 for which content data was received during a most recent iteration of block 1101. Based on the received context data received at block 1206 client computer device 120 at block 1206 can update display configuration data as depicted in Table B.

On completion of block 1104, manager system 110 can proceed to block 1105. At block 1105, manager system 110 can perform a next iteration of applying training data to predictive model 6002 using a just completed last iteration of blocks 1101-1103. Thus, it can be seen that predictive model 6002 can be trained with use of always current and iteratively updated training data, including training data obtained from a current use session of client computer device 120. On completion of block 1105, manager system 110 can return to block 1101 to wait for a next iteration of content data and/or feedback data received from client computer device 120.

Client computer device 120 at block 1206 can update configuration data as depicted in Table B. For example, a content area marked by default in Table B as being non-sensitive can be re-designated in Table B as being sensitive in dependence on the context data received at block 1206. Thus, it can be seen by the operation of evaluation block 1103 and Eq. 1 that a current display of data on display 121 can dynamically change in dependence on a variety of variable data including received content data, feedback data (received at block 1101), and sensor data (received at block 1102) including, e.g. location data, radio signal data, and/or video camera data. According to one example, it will be seen that system 100 by operation of Eq. 1 can be configured to dynamically transition display of data on display 121 from a non-sensitive display configuration to a sensitive display configuration in response to a determination that an environment in which client computer device 120 is operating has become crowded. Referring to Table B it can be seen that data of the content area of Row 2 designated by default as being non-sensitive can be designated as sensitive in dependence on received context data received at block 1206. It can also be seen from Table B the data of content area C3 of application A001 (Row 3) and content area of Row 6 can be designated in Table B as having the classification of non-sensitive HR meaning non-sensitive high-resolution. Client computer device 120, according to one embodiment can be configured at block 1206 to designate in Table B content areas having return context data sensitivity level scores exceeding a threshold e.g., 0.5, as being sensitive and can assign in Table B the label of non-sensitive to content areas have returned context data sensitivity levels of to the threshold, e.g. 0.5.

Referring again to the predictive model of FIG. 6, feedback data for use as training data for training predictive model 6002 can include feedback data specifying whether a historical user of system 100 has entered a display control e.g. a double tap on a displayed content area to cause display of the content area in a high resolution display configuration in which pixels of first display screen 1211 and second display screen 1212 are used for display of data of the content area. Such training data can be applied for display events associated to a plurality of users e.g. all users of system 100. Predictive model 6002 trained as described with use of feedback data specifying actions of user to activate a high-resolution display configuration, predictive model 6002 is able to predict in response to query data whether the current user desires that a certain content area currently being displayed on display 121 to be displayed in a high-resolution display configuration as set forth herein. Applied query data can include topic data of the current content area being examined and/or professional classification data of the user. Data of the returned prediction specifying whether the user desires that a content area be displayed in a high-resolution display configuration can be sent with the context data by manager system 110 at blocks 1104 for receipt by client computer device 120 at block 1206. Examination of the described context data that specifies whether the user desires that a content area referenced in Table B to be displayed in a high-resolution display configuration client computer device 120 can appropriately change a sensitive classification associated to Row of Table B to specify the classification of "non-sensitive HR". Client computer device 120 can be configured to be restricted from the applied label of non-sensitive HR to a content area unless the returned sensitivity level score, returned for the content area, exceeds a threshold e.g. 0.5 Manager system 110, in response to completion of block 1206 can proceed to block 1207.

Various available tools, libraries, and/or services can be utilized for implementation of predictive model 6002. For example, a machine learning service can provide access to libraries and executable code for support of machine learning functions. A machine learning service can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. Training predictive model 6002 can include use of e.g. support vector machines (SVM), Bayesian networks, neural networks and/or other machine learning technologies.

At block 1207, client computer device 120 can perform frame building to build frames of display data for display on display 121. Manager system 110 performing block 1207 can reference display configuration data of Table B so that content areas classified as non-sensitive can be displayed on first display screen 1211 and further so that content areas currently classified as non-sensitive can be displayed on second display screen 1212, and further so that content areas currently classified as being non-sensitive HR can be displayed using pixels of first display screen 1211 and second display screen 1212 in combination.

Client computer device 120 performing frame building block 1207 can include client computer device 120 referencing Table B to assure that coordinate spaces specified in Table B for the different content areas do not conflict and to the extent conflicts are identified client computer device 120 can apply machine logic to adjust the coordinate spaces assigned to the respective content areas to avoid conflict. At block 1207, client computer device 120 can reference the previously described coordinate space to pixel address mapping data to ascertain applicable pixel addresses of first display screen 1211 and/or second display screen 1212 for content areas of Table B identified for display. On completion of block 1207 client computer device 120 can proceed to block 1208.

At block 1208, client computer device 120 can send display data for receipt by display 121 at block 2211. On receipt of the frame display data received at block 2211 display 121 can display the frame display data. At block 1208, display manager utility program 101 can send frame display data for display using one or more display driver of display drivers 1111 to 1113 described in reference to FIG. 3. For display of content areas designated as non-sensitive, display manager utility program 101 can send frame display data through first display driver 1111 in communication with first display screen 1211 but not second display screen 1212. For display of content area data designated as sensitive display manager utility program 101 (FIG. 3) can send frame display data through second display driver 1112 which can be in communication with second display screen 1212 but not in communication with first display screen 1211. For display of content area data designated as being non-sensitive HR display manager utility program 101 can send frame display data through third display driver 1113, which can be in communication with each of first display screen 1211 and second display screen 1212 in combination. In response to the receipt frame display data received at block 2211 an appropriate one or more display screen, e.g., one or both of first display screen 1211 and/or second display screen 1212 can respond by presenting the received frame display data received at block 2211. With further reference to the flowchart of FIG. 4, client computer device 120 on completion of block 1208 can proceed to block 1209. Display manager utility program 101 can perform send block 1208 so that the depicted displayed data depicted in FIG. 7 herein is simultaneously displayed on display 121.

At block 1209, client computer device 120 can determine whether a current use session has ended. If the current use session has not ended client computer device 120 can return to block 1202 to iteratively examine the next iteration of application display requests and then client computer device 120 can proceed with the loop of blocks 1202-1209 until a use session has been determined to have terminated at block 1209. It will be seen that as the loop of block 1201 to 1209 is being iteratively performed the loop by manager system 110 at blocks 1101-1105 can also be iteratively performed. Referring to Eq. 1 and Table B and the description of evaluation block 1103 it can be seen that a display configuration for displaying content areas for display on display 121 can be in dependence on a variety of dynamically varying data. Such as dynamically varying content data, feedback data, and sensor data including location data, radio signal data, and/or video camera data. Accordingly, it will be seen that client computer device 120 can be dynamically transitioning display of first data at a certain X,Y coordinate location of display 121 (defining a display area) between a non-sensitive display configuration in which the client computer device 120 displays the first data on display screen 1211, and a sensitive display configuration in which the client computer device 120 displays the first data on second display screen 1212. The dynamically transitioning can be in dependence e.g. on an environment in which the client computer device 120 operates. For example, the dynamically transitioning can be in dependence on an environment of the client computer device 120 becoming crowded (e.g. by client computer device 120 being carried to a crowded venue or an increased number of users entering a current venue of the client computer device 120) or to a certain location ascertained to have a high sensitivity level. The dynamically transitioning can include reverting back to non-sensitive display of the first data, e.g. in response to a senses environment change of the client computer device 120, and/or a tapping or double tapping of the displayed first data displayed at the certain X,Y coordinate location of display 121.

Manager system 110 on completion of block 1209, when determining that a current use session has terminated, e.g. by power down or activation of a sleep mode, client computer device 120 can be returned to block 1201 to wait for a next use session to be commenced.

Figure 7:
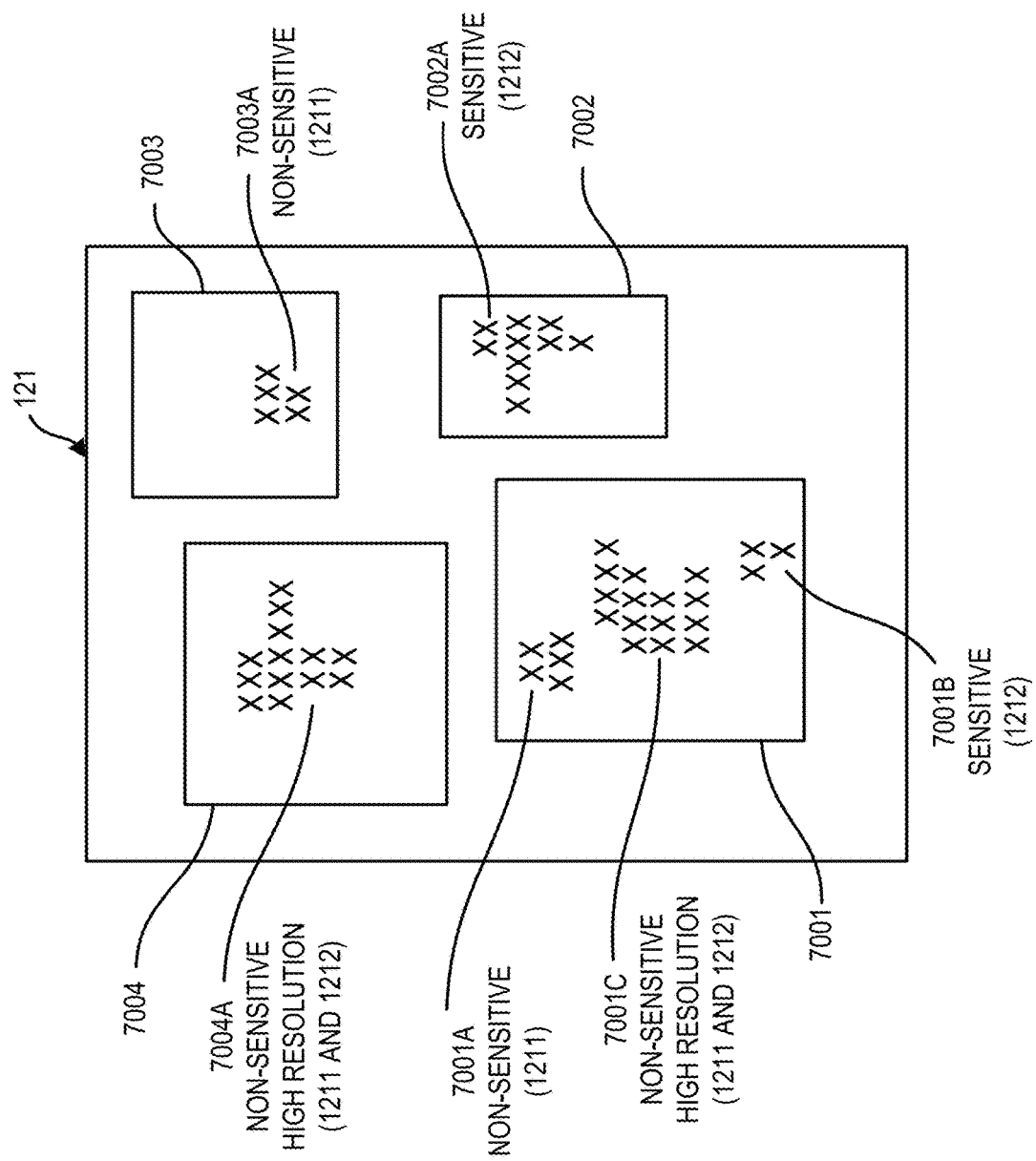
FIG. 7 depicts a display displaying frame display data according to multiple different display configurations according to one embodiment.

Referring now to FIG. 7, FIG. 7 illustrates display 121 displaying content areas as specified in Table B, in accordance with the sensitivity classification specified for the different content areas referenced in Table B. In accordance with frame display data sent at block 1208 display 121 can display in first window 7001 data of application A001, can display in second window 7002 data of application A002, can display in third window 7003 data of application A003, and can display in fourth window 7004 data of application A004. Window content area 7001A can be the content area C1 of application A001 of Table B, which can be displayed in a non-sensitive display configuration on first display screen 1211 based on frame display data received from first display driver 1111. Window content area 7001A can display data of the content area of Row 1 referenced as content area C1 of application A001 of Table B. Data of window content area 7001A in accordance with the decision data structure defined by Table B can be displayed in a non-sensitive display configuration, i.e. on first display screen 1211 having a wide viewing angle based on frame display data received from first display driver 1111. Window content area 7001B can display data of the content area of Row 2 referenced as content area C2 of application A001 of Table B. Data of window content area 7001B in accordance with the decision data structure defined by Table B can be displayed in a sensitive display configuration, i.e. on second display screen 1212 having a narrow viewing angle based on frame display data received from second display driver 1112. Window content area 7001C can display data of the content area of Row 3 referenced as content area C3 of application A001 of Table B. Data of window content area 7001C in accordance with the decision data structure defined by Table B can be displayed in a non-sensitive HR display configuration, i.e. using pixels of first display screen 1211 and second display screen 1212 in combination based on frame display data received from third display driver 1113. Window 7002 can include window content area 7002A referenced in Row 4 of Table B. Window content area 7002A can display data of the content area of Row 4 referenced as content area C1 of application A002 of Table B. Data of window content area 7002A in accordance with the decision data structure defined by Table B can be displayed in a sensitive display configuration, i.e. on second display screen 1212 having a narrow viewing angle based on frame display data received from second display driver 1112. Window content area 7003A can display data of the content area of Row 5 referenced as content area C1 of application A003 of Table B. Data of window content area 7003A in accordance with the decision data structure defined by Table B can be displayed in a non-sensitive display configuration, i.e. on first display screen 1211 having a wide viewing angle based on frame display data received from first display driver 1111. Window content area 7004A can display data of the content area of Row 6 referenced as content area C1 of application A004 of Table B. Data of window content area 7004A in accordance with the decision data structure defined by Table B can be displayed in a non-sensitive HR display configuration, i.e. using pixels of first display screen 1211 and pixels of second display screen 1212 in combination based on frame display data received from third display driver 1113. Display manager utility program 101 can perform send block 1208 so that the depicted displayed data depicted in FIG. 7 herein is simultaneously displayed on display 121.

Certain embodiments herein may offer various technical computing advantages including computing advantages to address problems arising in the realm of computer systems. Embodiments herein, for example, can improve data security by display of sensitive data in a sensitive display configuration. Embodiment herein can predict that certain displayed data is sensitive data and in response to predicting that the certain displayed data is sensitive can transition from displaying the certain displayed data in a non-sensitive display configuration to displaying the certain displayed data in a sensitive display configuration. Embodiments herein can include a client computer device having a particularly configured display that includes a first display screen and a second display screen. An operating system running on a computing node of the client computer device can run a display manager utility program that can communicate with a first display driver for use in displaying data on the first display screen and can communicate with the second display driver for display of data on the second display screen. The first display screen can include a first wider viewing angle and the second display screen can be configured to include a second narrower viewing angle that is narrower than the viewing angle of the first display screen. Embodiments herein can employ Artificial Intelligence (AI) platforms for predicting sensitivity level of content areas for display on a display of a client computer device. For determining sensitivity level associated to a content area, embodiments herein can examine, e.g. sensor data that specifies attributes of an environment in which the client computer device is operating and/or can determine a topic associated to content area for display. For topic extraction, embodiments herein can activate processing by natural language processing (NLP). Embodiments herein can provide location based services (LBS) e.g. so content displayed in a sensitive display configuration is in dependence on a sensed location of a client computer device. A fundamental aspect of operation of a computer system is its interoperation to which it operates including human actors. By increasing the accuracy and reliability of information presented to human users, embodiments herein increase the level of engagement of human users for enhanced computer system operation. Various decision data structures can be used to drive artificial intelligence (AI) decision making, such as decision data structure that cognitively and dynamically determine a sensitivity of displayed data of the client computer device. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, including machine learning platforms. Embodiments herein can employ data structuring processes, e.g. processing for transforming unstructured data into a form optimized for computerized processing. Embodiments herein can examine data from diverse data sources such as data sources that process radio signals for location determination of users and/or for determination of whether a user is located within a crowded environment. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 8:
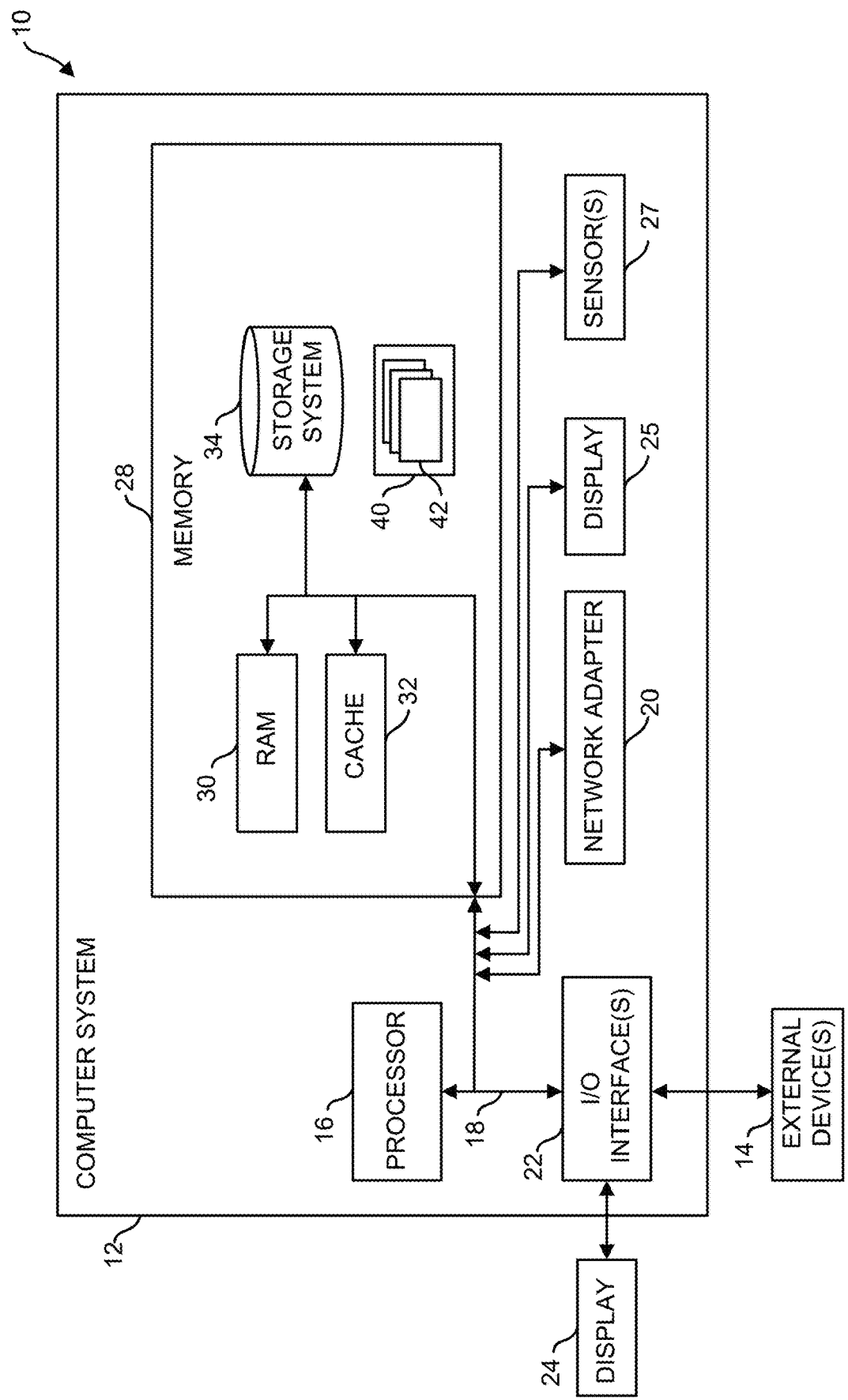
FIG. 8 depicts a computing node according to one embodiment.
Figure 9:
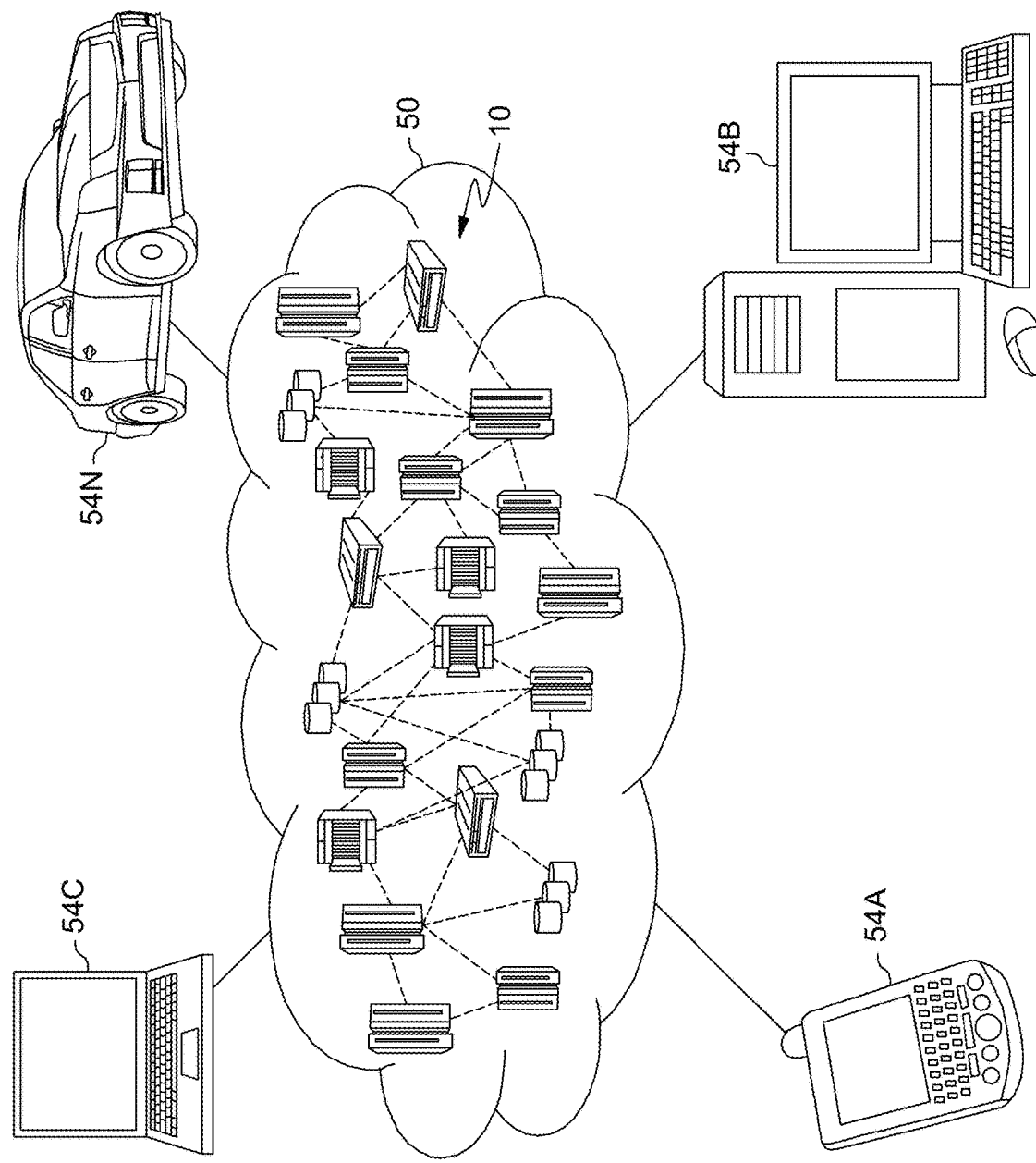
FIG. 9 depicts a cloud computing environment according to one embodiment.
Figure 10:
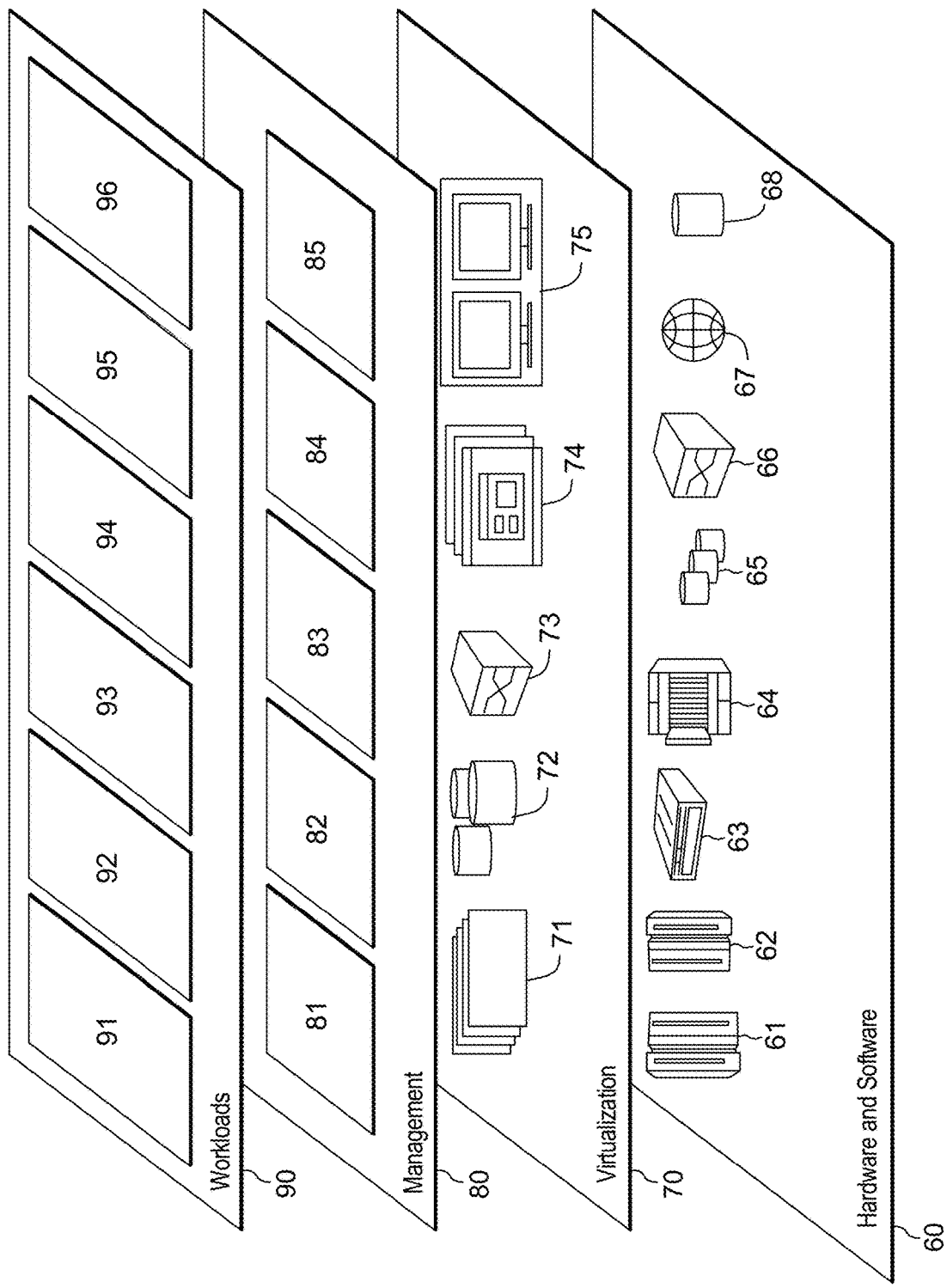
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, client computer device 120 can include one or more computing node 10 and can include one or more program 40 for performing functions described with reference to client computer device 120 as set forth in the flowchart of FIG. 4. In one embodiment, manager system 110 can include one or more computing node 10 and can include one or more program 40 for performing functions described with reference to manager system 110 as set forth in the flowchart of FIG. 4. In one embodiment, the computing node based systems and devices depicted in FIG. 1 can include, respectively, one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch display screen and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for displaying data as set forth herein. The processing components 96 can be implemented with use of one or more program 40 described in FIG. 8.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
presenting first data on a first area of a display, wherein the first data is non-sensitive data;
presenting second data on a second area of the display, wherein the second data is sensitive data;
wherein the first data is displayed at a first viewing angle, and wherein the second data is displayed at a second viewing angle, wherein the second viewing angle is narrower than the first viewing angle so that a viewing angle at which displayed data is visible is larger for the first data than for the second data, wherein the display has a first display screen and a second display screen, the first display screen configured to display content at the first viewing angle, the second display screen configured to display content at the second viewing angle, wherein the first display screen is defined by a first set of pixels, and wherein the second display screen is defined by a second set of pixels, wherein the first set of pixels extend in a first plane, and wherein the second set of pixels extends in a second plane defined below the first plane.

2. The computer implemented method of claim 1, wherein the method includes sending by an operating system of the client computer device first frame display data via a first display driver to the first display screen, and sending by the operating system of the client computer device second frame display data via a second display driver to the second display screen, wherein the second display driver is different than the first display driver, wherein the first frame display data includes the first data, wherein the second frame display data includes the second data.

3. The computer implemented method of claim 1, wherein respective pixels of the first set of pixels have first associated optics to project light at a first projection angle, wherein respective pixels of the second set of pixels have second associated optics to project light at a second projection angle, the second projection angle narrower than the first projection angle.

4. The computer implemented method of claim 1, wherein the display is disposed on a client computer device, wherein the method includes sending by an operating system of the client computer device first frame display data via a first display driver to the first display screen, and sending by an operating system of the client computer device first frame display data via a second display driver to the second display screen, wherein the first frame display data includes the first data, wherein the second frame display data includes the second data.

5. The computer implemented method of claim 1, wherein the display is disposed on a client computer device, wherein an operating system of the client computer device includes a first display driver to facilitate communication of the operating system with the first display screen, a second display driver to facilitate communication of the operating system with the second display screen, and a third display driver to facilitate communication of the operating system with the first display screen and the second display screen in combination, wherein the method includes the operating system sending frame display data through the third display driver to display on the display high resolution data that is displayed at a higher pixel resolution than a pixel resolution at which the second data is displayed.

6. The computer implemented method of claim 1, wherein the display is disposed on a client computer device, wherein the presenting the second data on a second area of the display is performed responsively to a determining that that the second data is sensitive, wherein the determining that the second data is sensitive includes subjecting the second data to Natural Language Processing (NLP) to extract a topic associated to the data, and wherein the determining that the second data is sensitive further includes ascertaining a sensitivity level of the second data using a result of a query of a predictive model that has been trained by machine learning, wherein training data for training the predictive model has included, for multiple historical events, data specifying user interface activity of a user of the client computer device in response presented with displayed content.

7. The computer implemented method of claim 1, wherein the display is disposed on a client computer device of a user, wherein the presenting the second data on a second area of the display is performed responsively to a determining that that the second data is sensitive, wherein the determining that the second data is sensitive includes examining data that indicates that the client computer device is operating in a crowded environment, wherein the examining data that indicates that the client computer device is operating in a crowded environment includes examining radio signal data received from devices in proximity with the client computer device and video camera data output by a camera sensor device integrated into the client computer device, wherein the client computer device is configured so that a field of view of the camera sensor device is wider than the first viewing angle, wherein the determining that the second data is sensitive includes examining location data of the client computer device and ascertaining a sensitivity level of the second data based on the location data using a mapping decision data structure that maps geographical locations to sensitivity levels associated to the geographical locations, wherein the determining that the second data is sensitive further includes subjecting the second data to natural language processing (NLP) to extract a topic associated to the data, and wherein the determining that the second data is sensitive further includes ascertaining a sensitivity level of the second data based on the topic using a mapping decision data structure that maps topics to sensitivity levels, and wherein the determining that the second data is sensitive further includes ascertaining a sensitivity level of the second data using a result of a query of a predictive model that has been trained by machine learning, wherein training data for training the predictive model has included, for multiple historical events, crowdsourced data specifying user interface activity of a plurality of users, including the user, in response to being presented with displayed content, wherein the display is disposed on a client computer device, wherein an operating system of the client computer device includes a first display driver to facilitate communication of the operating system with the first display screen, a second display driver to facilitate communication of the operating system with the second display screen, and a third display driver to facilitate communication of the operating system with the first display screen and the second display screen in combination, wherein the method includes the operating system sending frame display data through the third display driver to display on the display high resolution data that is displayed at a higher pixel resolution than a pixel resolution at which the second data is displayed, wherein the display has a first display screen and a second display screen, the first display screen configured to display content at the first viewing angle, the second display screen configured to display content at the second viewing angle, wherein the first display screen and the second display screen have common X and Y coordinate space dimensions, wherein the presenting the first data and the presenting the second data are performed so that the second data is simultaneously displayed on the display with the first data, wherein the method includes dynamically transitioning display of first data at the first area between a non-sensitive display configuration in which the first data is presented on the first display screen, and a sensitive display configuration in which the first data is reclassified as sensitive data and displayed on the second display screen, wherein the dynamically transitioning is responsive to sensing a change in an environment of the client computer device, and wherein the method includes, in response to the user tapping the first area reverting display of the first data back to the non-sensitive display configuration in which the first data is presented on the first display screen.

8. The computer implemented method of claim 1, wherein the display is disposed on a client computer device, wherein an operating system of the client computer device includes a first display driver in communication with the first display screen but not the second display screen, wherein the operating system of the client computer device includes a second display driver in communication with the second display screen but not the first display screen, wherein the method includes sending by the operating system of the client computer device first frame display data via the first display driver to the first display screen, and sending by the operating system of the client computer device second frame display data via the second display driver to the second display screen, wherein the second display driver is different than the first display driver, wherein the first frame display data includes the first data, wherein the second frame display data includes the second data.

9. The computer implemented method of claim 1, wherein the display is disposed on a client computer device, wherein an operating system of the client computer device includes a first display driver to facilitate communication of the operating system with the first display screen, and a second display driver to facilitate communication of the operating system with the second display screen, wherein the second display driver is different than the first display driver.

10. The computer implemented method of claim 1, wherein the display is disposed on a client computer device, wherein an operating system of the client computer device includes a first display driver to facilitate communication of the operating system with the first display screen, and a second display driver to facilitate communication of the operating system with the second display screen, wherein the second display driver is different than the first display driver, wherein the operating system includes a display manager utility program which manages the display of application data on the display, wherein the display manager utility program of the operating system sends non-sensitive designated content through the first display driver for display on the first display screen, wherein the display manager utility program of the operating system sends sensitive designated content through the second display driver for display on the second display screen.

11. The computer implemented method of claim 1, wherein the first display screen and the second display screen have common X and Y coordinate space dimensions, wherein the presenting the first data and the presenting the second data are performed so that the second data is simultaneously displayed on the display with the first data, wherein the method includes dynamically transitioning display of first data at the first area between a non-sensitive display configuration in which the first data is presented on the first display screen, and a sensitive display configuration in which the first data is reclassified as sensitive data and displayed on the second display screen, wherein the dynamically transitioning is responsive to sensing a change in an environment of the client computer device, and wherein the method includes, in response to the user tapping the first area reverting display of the first data back to the non-sensitive display configuration in which the first data is presented on the first display screen.

12. A system comprising:
a memory;
at least one processor in communication with the memory; and
program instructions executable by one or more processor via the memory to perform a method comprising:
presenting first data on a first area of a display, wherein the first data is non-sensitive data;
presenting second data on a second area of the display, wherein the second data is sensitive data;
wherein the first data is displayed at a first viewing angle, and wherein the second data is displayed at a second viewing angle, wherein the second viewing angle is narrower than the first viewing angle so that a viewing angle at which displayed data is visible is larger for the first data than for the second data, wherein the display has a first display screen and a second display screen, the first display screen configured to display content at the first viewing angle, the second display screen configured to display content at the second viewing angle, wherein the first display screen is defined by a first set of pixels, and wherein the second display screen is defined by a second set of pixels, wherein the first set of pixels extend in a first plane, and wherein the second set of pixels extends in a second plane defined below the first plane.

13. A computer implemented method comprising:
presenting first data on a first area of a display, wherein the first data is non-sensitive data;
presenting second data on a second area of the display, wherein the second data is sensitive data;
wherein the first data is displayed at a first viewing angle, and wherein the second data is displayed at a second viewing angle, wherein the second viewing angle is narrower than the first viewing angle so that a viewing angle at which displayed data is visible is larger for the first data than for the second data, wherein the display has a first display screen and a second display screen, the first display screen configured to display content at the first viewing angle, the second display screen configured to display content at the second viewing angle, wherein the first display screen and the second display screen have common X and Y coordinate space dimensions, wherein the presenting the first data and the presenting the second data are performed so that the second data is simultaneously displayed on the display with the first data, wherein the first display screen is defined by a first set of pixels, and wherein the second display screen is defined by a second set of pixels, wherein the method includes dynamically transitioning display of first data at the first area between a non-sensitive display configuration in which the first data is presented on the first display screen, and a sensitive display configuration in which the first data is reclassified as sensitive data and displayed on the second display screen, wherein the dynamically transitioning is responsive to sensing a change in an environment of the client computer device, and wherein the method includes, in response to the user tapping the first area reverting display of the first data back to the non-sensitive display configuration in which the first data is presented on the first display screen.

14. The computer implemented method of claim 13, wherein the display is disposed on a client computer device, wherein the presenting the second data on a second area of the display is performed responsively to a determining that that the second data is sensitive, wherein the determining includes examining configuration data defined by a user of the client computer device, wherein the configuration data specifies that a first application is a private application, and wherein the second data is data of the first application.

15. The computer implemented method of claim 13, wherein the first set of pixels and the second set of pixels extend in a common plane.

16. The computer implemented method of claim 13, wherein the first set of pixels extend in a first plane, and wherein the second set of pixels extends in a second plane defined below the first plane.

17. The computer implemented method of claim 13, wherein the display is disposed on a client computer device, wherein the presenting the second data on a second area of the display is performed responsively to a determining that that the second data is sensitive, wherein the determining that the second data is sensitive includes subjecting the second data to Natural Language Processing (NLP) to extract a topic associated to the data, and wherein the determining that the second data is sensitive further includes ascertaining a sensitivity level of the second data using a mapping decision data structure that maps topics to sensitivity levels.

18. The computer implemented method of claim 13, wherein the display is disposed on a client computer device of a user, wherein the presenting the second data on a second area of the display is performed responsively to a determining that that the second data is sensitive, wherein the determining that the second data is sensitive includes subjecting the second data to Natural Language Processing (NLP) to extract a topic associated to the data, and wherein the determining that the second data is sensitive further includes ascertaining a sensitivity level of the second data using a result of a query of a predictive model that has been trained by machine learning, wherein training data for training the predictive model has included, for multiple historical events, crowdsourced data specifying user interface activity of a plurality of users, including the user, in response to being presented with displayed content.

19. The computer implemented method of claim 13, wherein the display is disposed on a client computer device of a user, wherein the presenting the second data on a second area of the display is performed responsively to a determining that that the second data is sensitive, wherein the determining is in dependence on an examination of data indicating an attribute of an environment in which the client computer device is operating, and in dependence on historical data of the user.

20. The computer implemented method of claim 13, wherein the determining that the second data is sensitive includes ascertaining a sensitivity level of the second data using a result of a query of a predictive model that has been trained by machine learning, wherein training data for training the predictive model has included, for multiple historical events, data specifying user interface display tapping activity events of the user of the client computer device in which the user has tapped on a displayed content area of the display to change a sensitivity level of a display configuration for displaying the displayed content area.

* * * * *